United States Patent
Kamiya et al.

(10) Patent No.: US 9,178,813 B2
(45) Date of Patent: Nov. 3, 2015

(54) NETWORK SYSTEM AND FRAME COMMUNICATION METHOD

(75) Inventors: Satoshi Kamiya, Tokyo (JP); Kiyohisa Ichino, Tokyo (JP); Noriaki Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 13/824,765

(22) PCT Filed: Sep. 5, 2011

(86) PCT No.: PCT/JP2011/004968
§ 371 (c)(1),
(2), (4) Date: May 8, 2013

(87) PCT Pub. No.: WO2012/060038
PCT Pub. Date: May 10, 2012

(65) Prior Publication Data
US 2013/0223450 A1 Aug. 29, 2013

(30) Foreign Application Priority Data

Nov. 2, 2010 (JP) ................................ 2010-246216
Apr. 8, 2011 (JP) ................................ 2011-086151

(51) Int. Cl.
*H04L 12/721* (2013.01)
*H04L 12/931* (2013.01)
(Continued)

(52) U.S. Cl.
CPC *H04L 45/72* (2013.01); *H04L 1/18* (2013.01); *H04L 49/25* (2013.01); *H04L 49/357* (2013.01)

(58) Field of Classification Search
USPC ......... 370/392, 401, 312, 389, 393, 235, 236; 709/224, 230, 238, 246
See application file for complete search history.

(56) References Cited

U.S. PATENT DOCUMENTS

| 7,558,264 B1 * | 7/2009 | Lolayekar et al. ............ 370/392 |
| 8,514,856 B1 * | 8/2013 | Gai et al. ...................... 370/389 |

(Continued)

FOREIGN PATENT DOCUMENTS

| JP | 2010-141443 A | 6/2010 |
| WO | WO 01/91345 A1 | 11/2001 |

OTHER PUBLICATIONS

English translation of PCT/ISA/237 (written opinion of the international searching authority, dated Oct. 11, 2011).

(Continued)

*Primary Examiner* — Edan Orgad
*Assistant Examiner* — Saumit Shah
(74) *Attorney, Agent, or Firm* — McGinn IP Law Group, PLLC.

(57) ABSTRACT

A network system has: a node performing transmission/reception of a frame based on FCoE; a network; a controller performing management of the node and the network; and a gateway provided with respect to the node. The frame is classified into a control frame and a data frame. The gateway determines whether a frame received from the node is the control frame or the data frame, forwards the control frame to the controller, and forwards the data frame to the network. The controller performs the management based on the control frame received from the gateway. The network transfers the data frame received from the gateway to a destination node without through the controller. The node has a retransmission control and reordering unit configured to perform retransmission control and reordering processing with respect to the data frame.

10 Claims, 21 Drawing Sheets

(51) Int. Cl.
*H04L 12/947* (2013.01)
*H04L 1/18* (2006.01)

(56) References Cited

U.S. PATENT DOCUMENTS

| | | |
|---|---|---|
| 2002/0194367 A1 | 12/2002 | Nakamura et al. |
| 2003/0012196 A1 | 1/2003 | Ramakrishnan |
| 2003/0046396 A1 | 3/2003 | Richter et al. |
| 2003/0206542 A1 | 11/2003 | Holder |
| 2003/0223414 A1 | 12/2003 | Wong |
| 2004/0054902 A1 | 3/2004 | Fujimoto et al. |
| 2004/0105415 A1 | 6/2004 | Fujiwara et al. |
| 2005/0021600 A1 | 1/2005 | Lagosanto et al. |
| 2005/0226165 A1* | 10/2005 | Pope et al. ............... 370/251 |
| 2008/0159260 A1 | 7/2008 | Vobbilisetty et al. |
| 2008/0209300 A1* | 8/2008 | Fukushima et al. ......... 714/748 |
| 2008/0240106 A1 | 10/2008 | Schlenk |
| 2010/0061242 A1 | 3/2010 | Sindhu et al. |
| 2010/0061383 A1* | 3/2010 | Rupanagunta et al. ...... 370/401 |
| 2010/0061391 A1 | 3/2010 | Sindhu et al. |
| 2010/0061394 A1 | 3/2010 | Sindhu et al. |
| 2010/0142545 A1 | 6/2010 | Kurita |
| 2010/0177637 A1 | 7/2010 | Kadambi et al. |
| 2011/0058573 A1 | 3/2011 | Balakavi et al. |
| 2011/0262134 A1 | 10/2011 | Armstrong et al. |
| 2011/0286342 A1 | 11/2011 | Ee et al. |
| 2012/0026868 A1 | 2/2012 | Chang et al. |
| 2012/0039163 A1 | 2/2012 | Nakajima |
| 2012/0177042 A1 | 7/2012 | Berman |
| 2012/0177045 A1 | 7/2012 | Berman |
| 2012/0177370 A1 | 7/2012 | Berman |

OTHER PUBLICATIONS

PCT/IB/373 dated May 7, 2013.
International Search Report (ISR) (PCT Form PCT/ISA/210), in PCT/JP2011/004968, dated Oct. 11, 2011.
INCITS TC T11, Fibre Channel Backbone-5, http://www.fcoe.com/09-056v5.pdf.
Gary Lee, Ethernet Fabric Requirements for FCoE in the Data Center, Ethernet Technology Summit, Feb. 2010.
United States Office Action dated Feb. 25, 2015, in co-pending U.S. Appl. No. 13/824,297.
Japanese Office Action dated Nov. 4, 2014 with a partial English translation.
Satoshi Kamiya, et al., "Proposal for Extension of Fibre Channel ove Ethernet: 'Advanced FCoE'", IEICE, 2010.
International Search Report (ISR) (PCT Form PCT/ISA/210), in PCT/JP2011/003565, dated Jul. 19, 2011.
PCT/ISA/237 (English translation of written opinion of the international searching authority, dated Jul. 19, 2011) in PCT/JP2011/003565.
PCT/IB/373 in PCT/JP2011/003565 dated Mar. 19, 2013.
United States Notice of Allowance dated Jun. 18, 2015 in co-pending U.S. Appl. No. 13/824,297.

\* cited by examiner

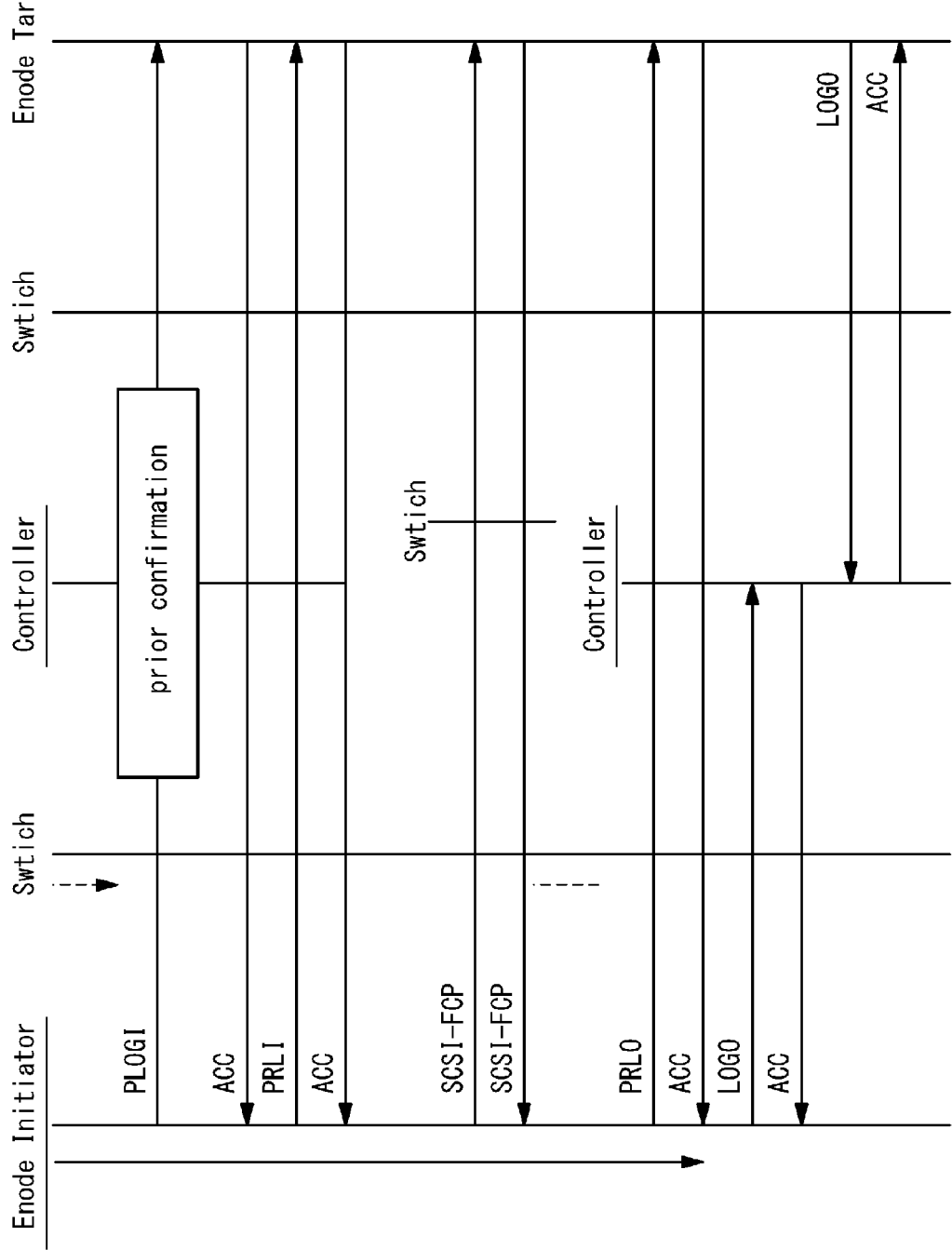

NETWORK SYSTEM AND FRAME COMMUNICATION METHOD

TECHNICAL FIELD

The present invention relates to a network system that performs frame communication.

BACKGROUND ART

One of technologies for performing communication on a network is "data encapsulation". The details are as follows.

A data transferred between networks constitutes its form in accordance with a communication system used at the time of the transfer. The communication on the network is performed through a plurality of layers, as represented by OSI Reference Model and TCP/IP stack. Therefore, the form of the data needs to be capable of supporting specification of each layer. In general, a data consists of a header and a payload. The header includes a content that serves as a control data at a specific layer, and a communication standard at that layer interprets the content of the header to forward the payload to another layer. At each layer, the header is added ahead of the payload at a time of transmission and the header is removed at a time of reception. Therefore, the payload includes a content that can serve as the header at an upper layer. When a data communication is initiated, a data is generated from the top layer of the communication system. The data passes through lower layers one after another, passes through the bottom layer and then is output to the network. Before the data reaches the bottom layer, the header associated with each layer is added to the data and a portion being the header at the upper layer is treated as the payload. The addition of the header thus performed is called the data encapsulation.

The data encapsulation can be regarded as a technique that makes it possible by adding the header associated with a specific communication system to communicate with the communication system with which communication has not been available. By the application of this technique, it is possible to improve data security and to create a new communication system that can support a plurality of existing communication systems.

A new communication system that utilizes this technique is described in Non-Patent Literature 1. According to Non-Patent Literature 1, "Fibre Channel Over Ethernet (FCoE)" is proposed as one technique for a recent data center.

A recent data center is operated with a network configuration in which Storage Area Network (SAN) as represented by Fibre Channel (FC) and Local Area Network (LAN) as represented by Ethernet (registered trade mark) are mixed. Since separate networks are mixed, management costs and device costs are rising, which is a problem.

Because of this situation, the FCoE has been proposed. According to the FCoE, an FC data is encapsulated by using an Ethernet header and a newly-defined FCoE header. As a result, it is possible to integrate the communication system into the Ethernet system and to achieve a network configuration that the SAN and the LAN are integrated. Since uniform management and devices can be achieved on the integrated network, the FCoE is considered as a promising technique for solving the problem.

However, according to the current FCoE, the communication needs to invariably go through an FCoE communication-dedicated switch that is called an "FCoE Forwarder (FCF)". This causes constraint on network flexibility and extensibility. Therefore, it is not possible to deal with the data center configuration that utilizes a large number of nodes.

CITATION LIST

Non Patent Literature

[NPL 1]
INCITS TC T11, Fibre Channel Backbone-5.

SUMMARY OF INVENTION

In the communication system described in Non-Patent Literature 1, there exists a device through which frames invariably go at a time of communication. This causes deterioration of network flexibility and extensibility.

An object of the present invention is to provide a technique that can improve network flexibility and extensibility.

In an aspect of the present invention, a network system is provided. The network system has: a node configured to perform transmission and reception of a frame based on FCoE (Fibre Channel Over Ethernet); a network configured to transfer the frame; a controller configured to perform management of the node and the network; and a gateway provided with respect to the node. The frame is classified into a control frame for communicating control information necessary for communication and a data frame for communicating data between nodes. The gateway determines whether a frame received from the node is the control frame or the data frame, forwards the control frame to the controller, and forwards the data frame to the network. The controller performs the management based on the control frame received from the gateway. The network transfers the data frame received from the gateway to a destination node without through the controller. The node has a retransmission control and reordering unit configured to perform retransmission control and reordering processing with respect to the data frame.

In another aspect of the present invention, a frame communication method in a network system is provided. The network system has: a node configured to perform transmission and reception of a frame based on FCoE (Fibre Channel Over Ethernet); a network configured to transfer the frame; and a controller configured to perform management of the node and the network. The frame is classified into a control frame for communicating control information necessary for communication and a data frame for communicating data between nodes. The frame communication method includes: (A) determining whether a frame transmitted from the node is the control frame or the data frame; (B) forwarding the control frame to the controller and performing, in the controller, the management based on the control frame; (C) forwarding the data frame to the network and transferring the data frame to a destination node without through the controller; and (D) performing, in the node, retransmission control and reordering processing with respect to the data frame.

According to the present invention, frames transmitted from the node are divided into the control frames and the data frames. The data frames whose amount of information is enormous as compared with the control frames are transferred without through a specific route. That is, the communication system according to the present invention is freed from the constraint that there exists a device through which the data frames, which greatly contributes to network performance, invariably go. It is therefore possible to improve network flexibility and extensibility.

Moreover, a frame lossless network is achieved, since the node is provided with a retransmission control and reordering function.

DESCRIPTION OF EMBODIMENTS

Exemplary embodiments of the present invention will be described with reference to the attached drawings.

1. U/C Separation Function

The applicant of this patent application has described, in a prior application (Japanese Patent Application JP-2010-208048) that is not yet published, a "U/C separation function" as a means of solving the above-mentioned problems. According to the U/C separation function, frames transmitted from a node are divided into data frames (user data frames) and control frames. The data frames whose amount of information is enormous as compared with the control frames are transferred without through a specific route. That is, the U/C separation function makes it possible to be freed from the constraint that there exists a device through which the data frames, which greatly contributes to network performance, invariably go. It is therefore possible to improve network flexibility and extensibility.

Hereinafter, the U/C separation function will be described in detail. It should be noted that the contents described in Japanese Patent Application JP-2010-208048 that is not yet published are incorporated herein in its entirety by reference.

1-1. Configuration

Figure 1:
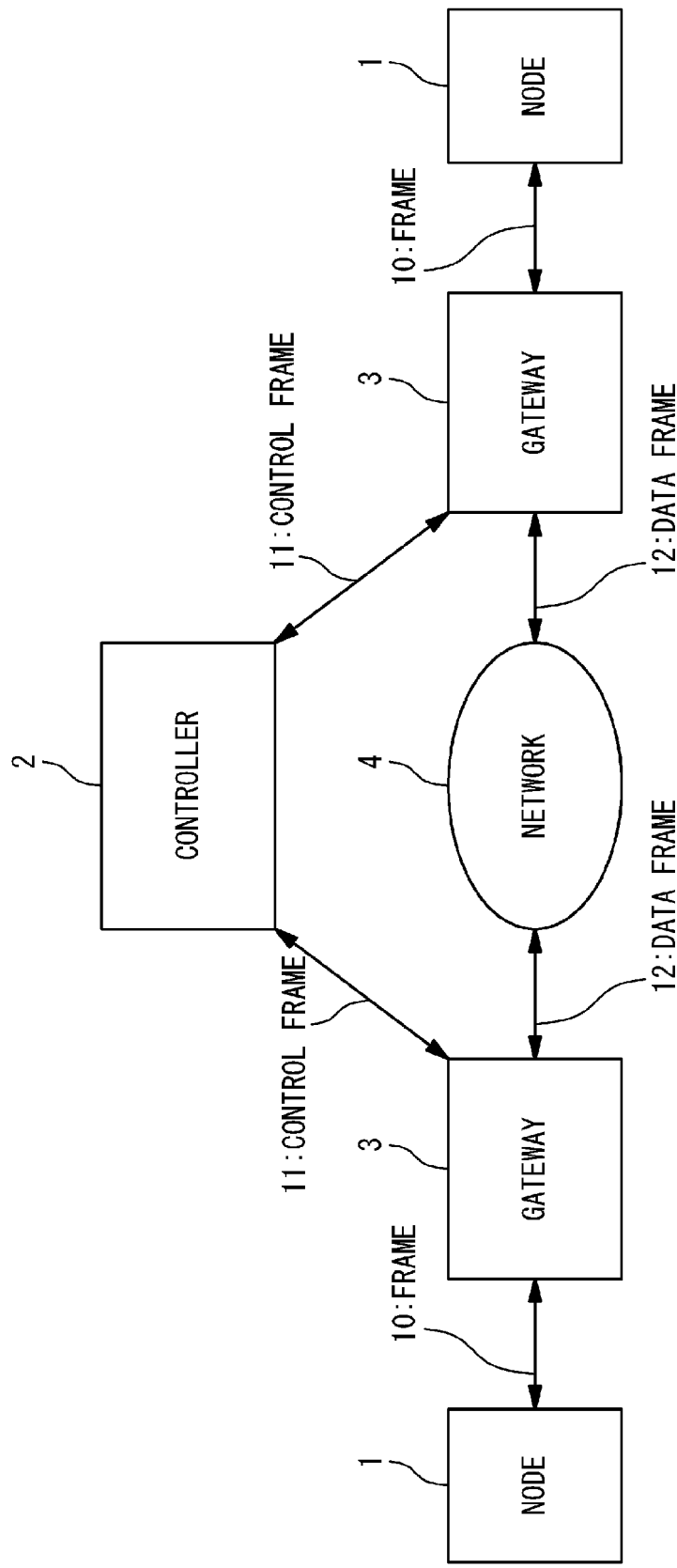
FIG. 1 is a block diagram showing a configuration of a network system according to an exemplary embodiment of the present invention.

FIG. 1 is a block diagram showing a configuration of a network system according to the present exemplary embodiment. The network system according to the present exemplary embodiment has a node 1, a controller 2, a gateway 3 and a network 4. The node 1 is connected to the gateway 3. The gateway 3 is connected between the node 1 and the network 4. The controller 2 is connected to each gateway 3.

The node 1 performs transmission and reception of frames 10. The frames 10 are classified into control frames 11 and data frames 12. The control frame 11 is a frame 10 used for communicating control information necessary for communication. For example, the control frame 11 is used for accessing to a communication network, logging-in a device and exchanging information for it. On the other hand, the data frame 12 is a frame 10 used for data transmission and reception between the nodes 1. It should be noted here that the amount of information of the data frames 12 is enormous as compared with that of the control frames 11. It is possible to discriminate the control frame 11 and the data frame 12 based on a frame type of the frame 10.

The network 4 transfers the frames 10 that are communicated between the nodes 1. The network 4 is configured by a combination of connection devices such as switches that relay frames and network cables connecting between the connection devices.

The gateway 3 and the node 1 are configured in pairs. The gateway 3 receives a frame 10 transmitted from the node 1 and determines whether the received frame 10 is a control frame 11 or a data frame 12. Then, the gateway 3 forwards the control frame 11 to the controller 2 and forwards the data frame 12 to the network 4. That is, the data frames 12 whose amount of information is enormous are transferred by the network 4 to a destination without going through the controller 2. Moreover, the gateway 3 receives a frame 10 (control frame 11, data frame 12) from the controller 2 and the network 4 and forwards the received frame 10 to the node 1. It should be noted that the gateway 3, when forwarding the frame 10, changes information of the frame 10 as necessary such that the destination device can treat the frame 10 correctly. The details will be described later.

The controller 2 receives the control frame 11 from the gateway 3 and treats the control frame 11. More specifically, the controller 2 performs management of information regarding the node 1 and the network 4, based on contents of the received control frame 11. Moreover, the controller 2 transmits or forwards the frame 10 to the node 1 and the gateway 3, as necessary.

Figure 2:
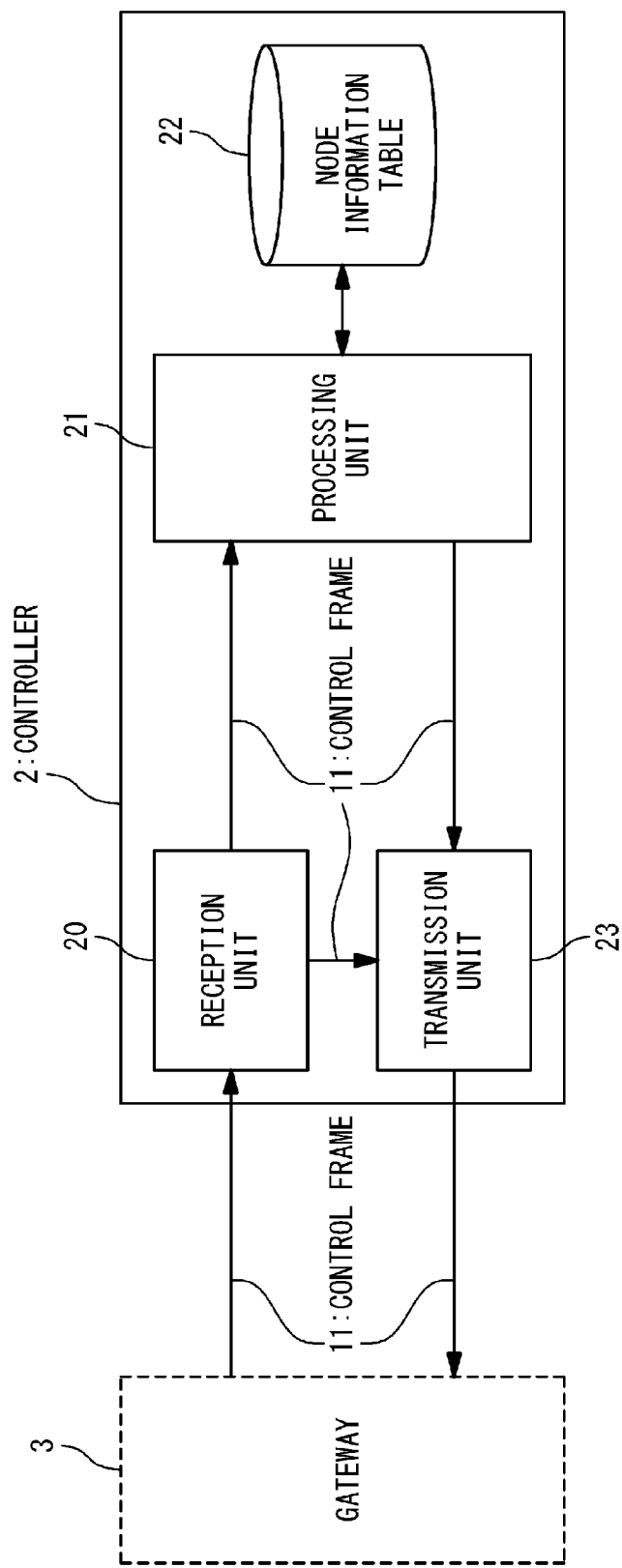
FIG. 2 is a block diagram showing a configuration of a controller according to the exemplary embodiment of the present invention.

A configuration of the controller 2 will be described below in detail. FIG. 2 is a block diagram showing a configuration of the controller 2. The controller 2 has a reception unit 20, a processing unit 21, a node information table 22 and a transmission unit 23.

The node information table 22 indicates management information regarding the node 1, the gateway 3 and the connection devices on the network 4. The reception unit 20 receives the control frame 11 from the gateway 3 and forwards the control frame 11 to the processing unit 21. The processing unit 21 performs processing according to contents of the received control frame 11. For example, the processing unit 21 updates the node information table 22 according to contents of the control frame 11. Also, the processing unit 21 generates a reply control frame 11 by referring to the node information table 22 and outputs the reply control frame 11 to the transmission unit 23. Also, the processing unit 21 forwards the received control frame 11 as it is to the transmission unit 23. The transmission unit 23 transmits the control frame 11 received from the processing unit 21 to a target gateway 3.

Figure 3:
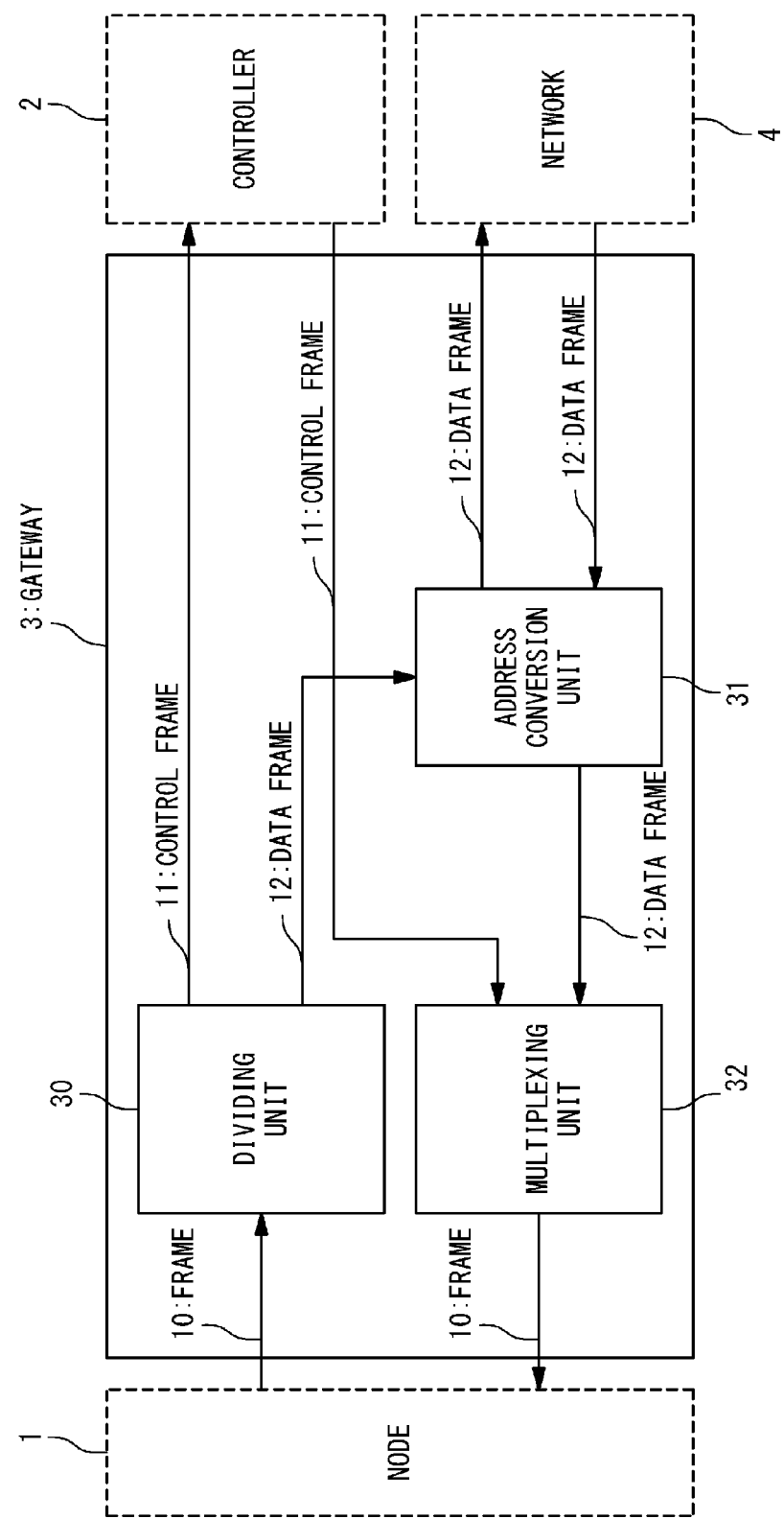
FIG. 3 is a block diagram showing a configuration of a gateway according to the exemplary embodiment of the present invention.

A configuration of the gateway 3 will be described below in detail. FIG. 3 is a block diagram showing a configuration of the gateway 3. The gateway 3 has a dividing unit 30, an address conversion unit 31 and a multiplexing unit 32.

The dividing unit 30 receives a frame 10 from the node 1. The dividing unit 30 analyzes the received frame 10 to determine whether the frame 10 is a control frame 11 or a data frame 12. Then, the dividing unit 30 forwards the control frame 11 to the controller 2 and forwards the data frame 12 to the address conversion unit 31. The address conversion unit 31 converts a destination MAC address of the data frame 12 received from the dividing unit 30 and then forwards the data frame 12 to the network 4. Moreover, when receiving a data frame 12 from the network 4, the address conversion unit 31 converts a source MAC address of the received data frame 12 and then outputs the data frame 12 to the multiplexing unit 32. The multiplexing unit 32 outputs the control frame 11 input from the controller 2 and the data frame 12 input from the address conversion unit 31 to the node 1.

According to the present exemplary embodiment, as described above, the frames 10 transmitted from the node 1 are divided into the control frames 11 and the data frames 12. The data frames 12 whose amount of information is enormous as compared with the control frames 11 are transferred without through a specific route (controller 2). That is, the communication system according to the present exemplary embodiment is freed from the constraint that there exists a device through which the data frames 12, which greatly contributes to network performance, invariably go. It is therefore possible to improve network flexibility and extensibility.

1-2. Operation Flow of Controller 2

Figure 4:
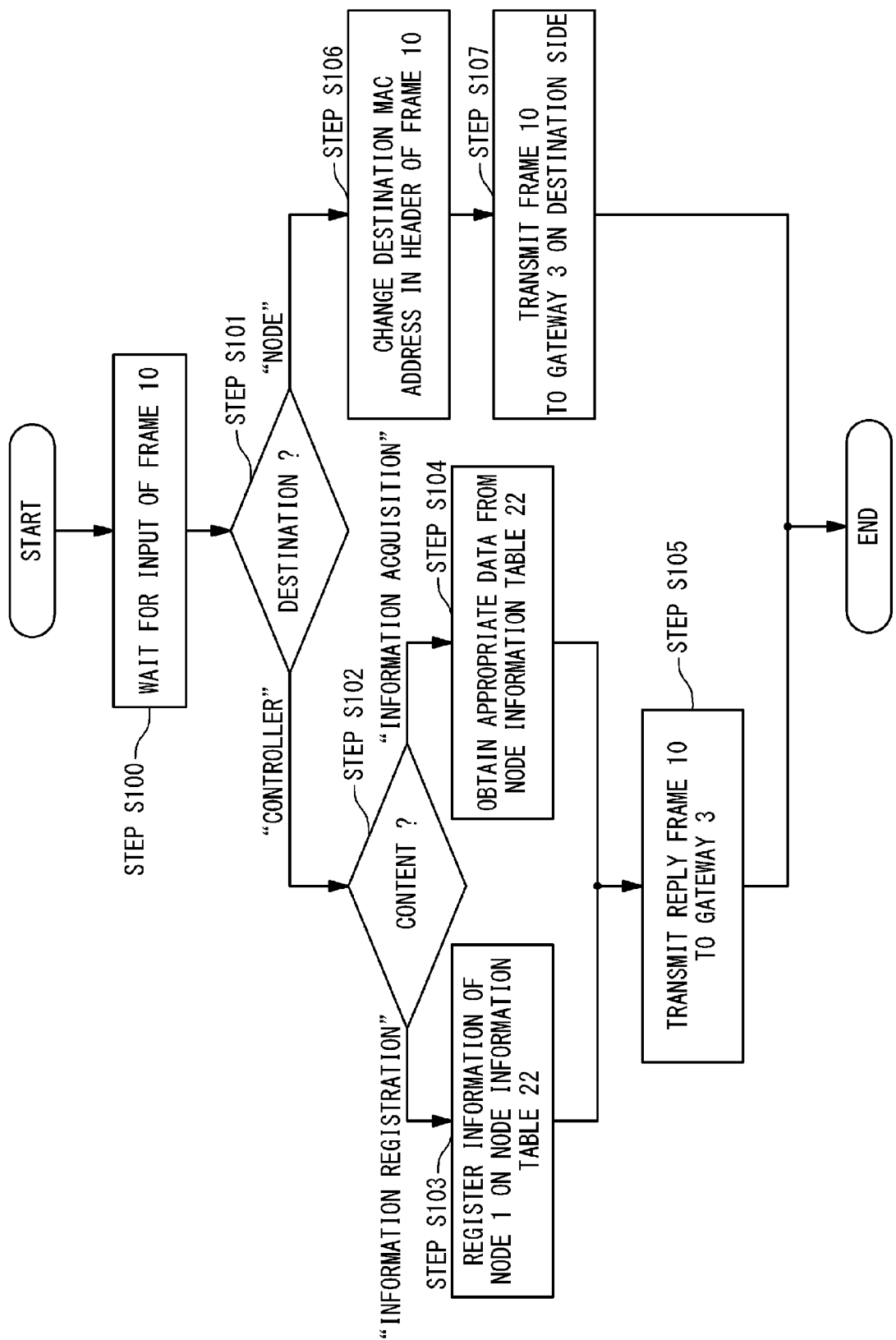
FIG. 4 is a flow chart showing an operation of a controller according to the exemplary embodiment of the present invention.

FIG. 4 is a flow chart showing an operation of the controller 2 according to the present exemplary embodiment. An operation flow of the controller 2 will be described below with reference to FIG. 2 and FIG. 4.

Step S100:
The processing unit 21 waits for input of the frame 10 (control frame 11) from the reception unit 20.

Step S101:
The processing unit 21 refers to a header and a payload of the frame 10 received from the reception unit 20 to determine whether the destination (terminal) of the frame 10 is the controller 2 or a node 1 on the opposite side of the source. If the destination is the controller 2, the processing proceeds to Step S102. On the other hand, if the destination is the node 1, the processing proceeds to Step S106.

Step S102:
The processing unit 21 determines a type of the frame 10. More specifically, the processing unit 21 determines whether the frame 10 is one (information registration frame) for registering information of the source node 1 or one (information acquisition frame) for acquiring information of another node 1 or the controller 2. In the case of the information registration frame, the processing proceeds to Step S103. On the other hand, in the case of the information acquisition frame, the processing proceeds to Step S104.

Step S103:
Based on the information registration frame, the processing unit 21 registers the information of the source node 1 on the node information table 22. After that, the processing proceeds to Step S105.

Step S104:
The processing unit 21 obtains information corresponding to requirement by the information acquisition frame from the node information table 22. After that, the processing proceeds to Step S105.

Step S105:
The processing unit 21 generates a reply frame 10 (control frame 11). In the case where the above-mentioned Step S104 is performed, the processing unit 21 incorporate the information obtained from the node information table 22 into the reply frame 10. Then, the processing unit 21 outputs the reply frame 10 to the transmission unit 23. The transmission unit 23 transmits the reply frame 10 to the gateway 3 on the side of the source node 1.

Step S106:
On the other hand, if the destination is the node 1, the processing unit 21 changes a destination MAC address of the frame 10 by referring to the node information table 22. Then, the processing unit 21 outputs the frame 10 to the transmission unit 23.

Step S107:
The transmission unit 23 transmits the frame 10 to the gateway 3 on the side of the destination node 1.

1-3. Modification Example

Figure 5:
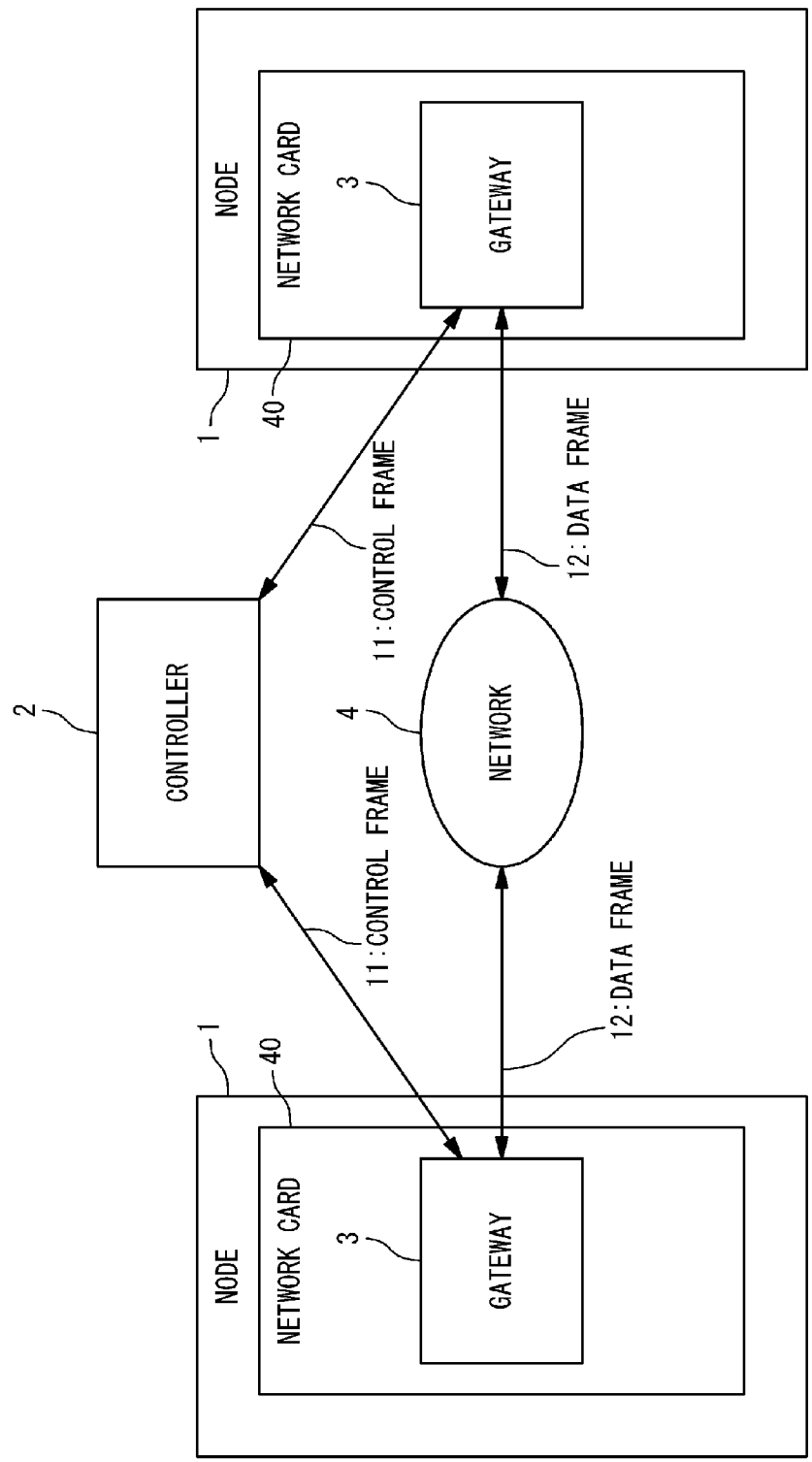
FIG. 5 is a block diagram showing a modification example of the network system according to the exemplary embodiment of the present invention.

FIG. 5 is a block diagram showing a modification example of the network system according to the present exemplary embodiment. According to the present modification example, the gateway 3 is built in a network device within the node 1. More specifically, the node 1 has a network card 40, and the gateway 3 is built in the network card 40. The gateway 3 in FIG. 5 is the same as the gateway 3 in FIG. 1 except for the installation location. According to the present modification example, functions are concentrated in the node 1 and thus the network flexibility is expected to be further improved.

Figure 6:
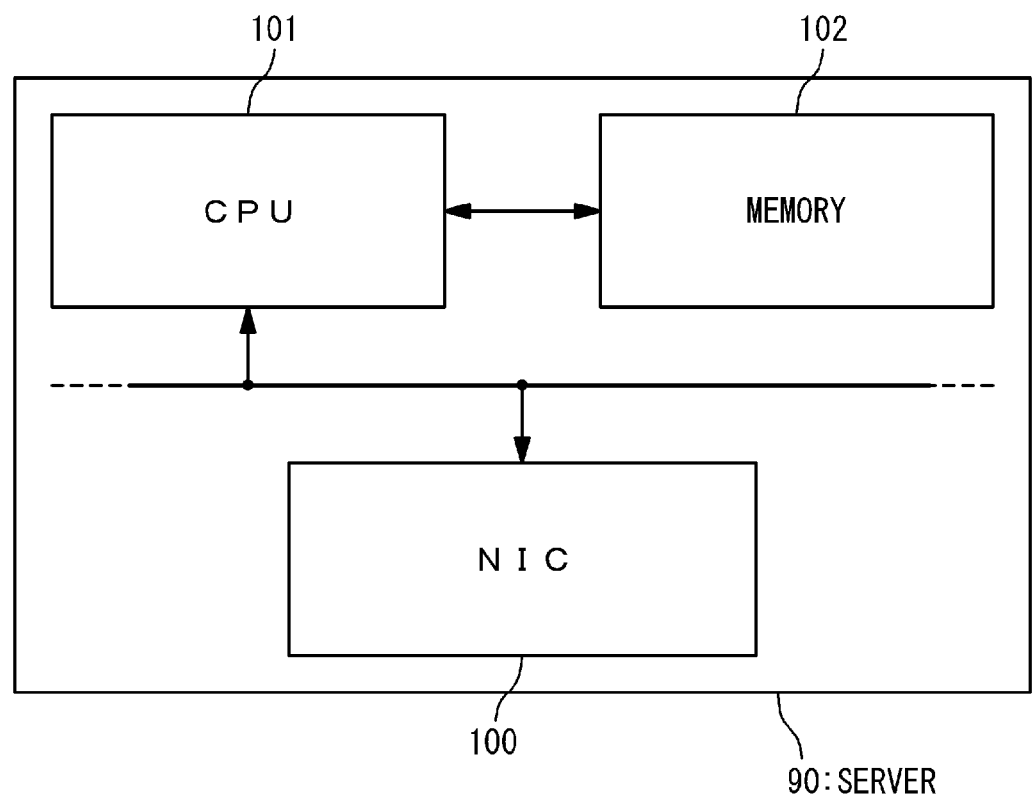
FIG. 6 is a block diagram showing a hardware configuration example of the controller according to the exemplary embodiment of the present invention.

FIG. 6 is a block diagram showing a hardware configuration example of the controller 2 according to the present exemplary embodiment. The functions of the controller 2 are implemented in a single server 90. The server 90 has a network interface card (NIC) 100, a processor (CPU) 101 and a memory 102. The functions of the controller 2 are achieved by cooperation of the hardware and a computer program. More specifically, the network interface card 100 that transmits and receives the frames 10 functions as the above-described reception unit 20 and transmission unit 23. The processor 101 that performs the frame processing functions as the above-described processing unit 21. The above-described node information table 22 is stored in the memory 102. It should be noted that the computer program that realizes the functions of the controller 2 may be recorded on a tangible computer-readable recording medium.

1-4. Application to FCoE

Next, let us consider a case where the present exemplary embodiment is applied to the FCoE.

Figure 7:
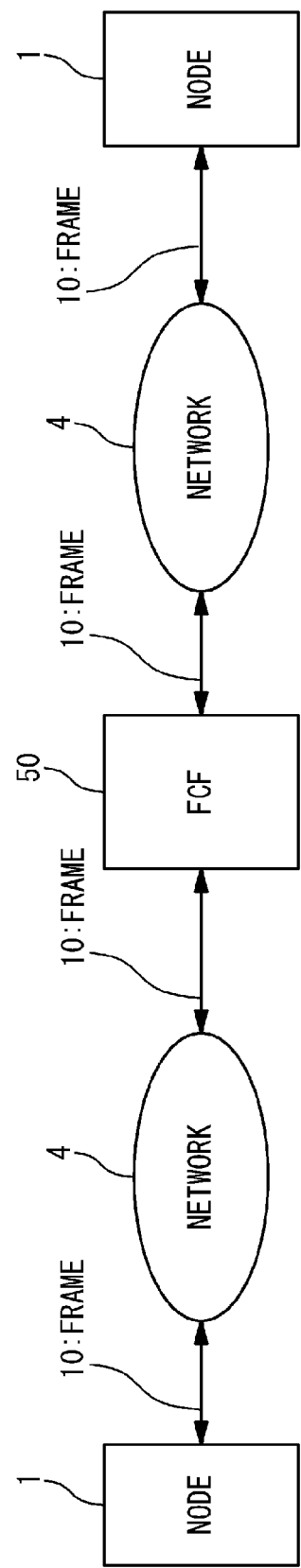
FIG. 7 is a block diagram showing a configuration of a typical FCoE communication network.

FIG. 7 is a block diagram showing a configuration of a typical FCoE communication network. The node 1 that performs the frame communication based on the FCoE is connected to an FCF (FCoE Forwarder) 50 through the network 4 configured by links that support the FCoE. The FCF 50 is a switch for use in the FCoE communication. Currently, the FCoE communication is invariably required to go through the FCF 50.

Figure 8:
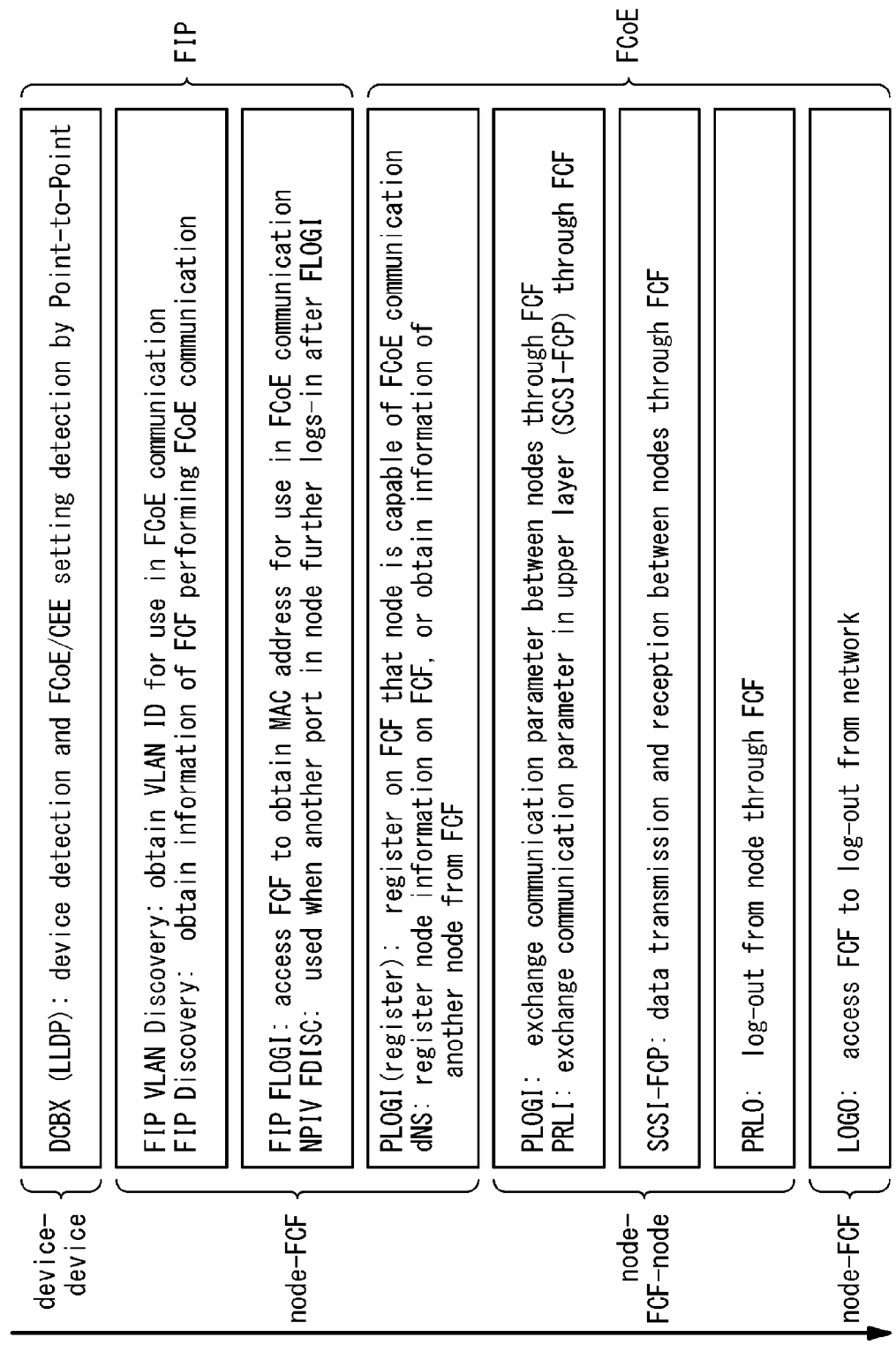
FIG. 8 is a classification diagram of frames used in the typical FCoE communication.

FIG. 8 is a classification diagram of frames used in the typical FCoE communication. Respective frames will be described in order.

1. DCBX (LLDP): exchange information on extension functions used in the Ethernet communication network for performing the FCoE communication, between links.

2. FIP VLAN Discovery: the node obtains a VLAN ID for use in the FCoE communication from the FCF.

3. FIP Discovery: the node obtains a MAC address of the FCF for use in the FCoE communication from the FCF.

4. FIP FLOGI: the node accesses the FCF to obtain a MAC address of itself for use in the FCoE communication.

5. PLOGI: the node exchanges information for the FCoE communication with the FCF and the destination node through the FCF.

6. PRLI: the node exchanges information for data communication with the destination node through the FCF.

7. SCSI-FCP: the node communicates with the destination node through the FCF.

8. PRLO: the node cuts off connection between the nodes (deletes information) through the FCF.

9. LOGO: the node accesses the FCF to cut off the connection between the FCF and the node (deletes information).

The "SCSI-FCP frame" among the above corresponds to the data frame 12, whose amount of information is much larger than that of the other types of frames. In the case of the typical FCoE communication network shown in FIG. 7, all the frames including the SCSI-FCP frames go through the FCF 50. Therefore, a transfer time of the SCSI-FCP frames greatly affects the network performance.

An operation in a case where the present exemplary embodiment is applied to the FCoE is as follows.

First, an operation of the gateway 3 will be described. The gateway 3 determines whether the received frame 10 is a control frame 11 or a data frame 12. The control frame 11 is a frame for exchanging information required for accessing the destination node 1. On the other hand, the data frame 12 is a frame for data transmission and reception between the nodes 1. Among the frames shown in FIG. 8, the "SCSI-FCP" is determined to be the data frame 12 and the rest frame is determined to be the control frame 11.

Figure 9:
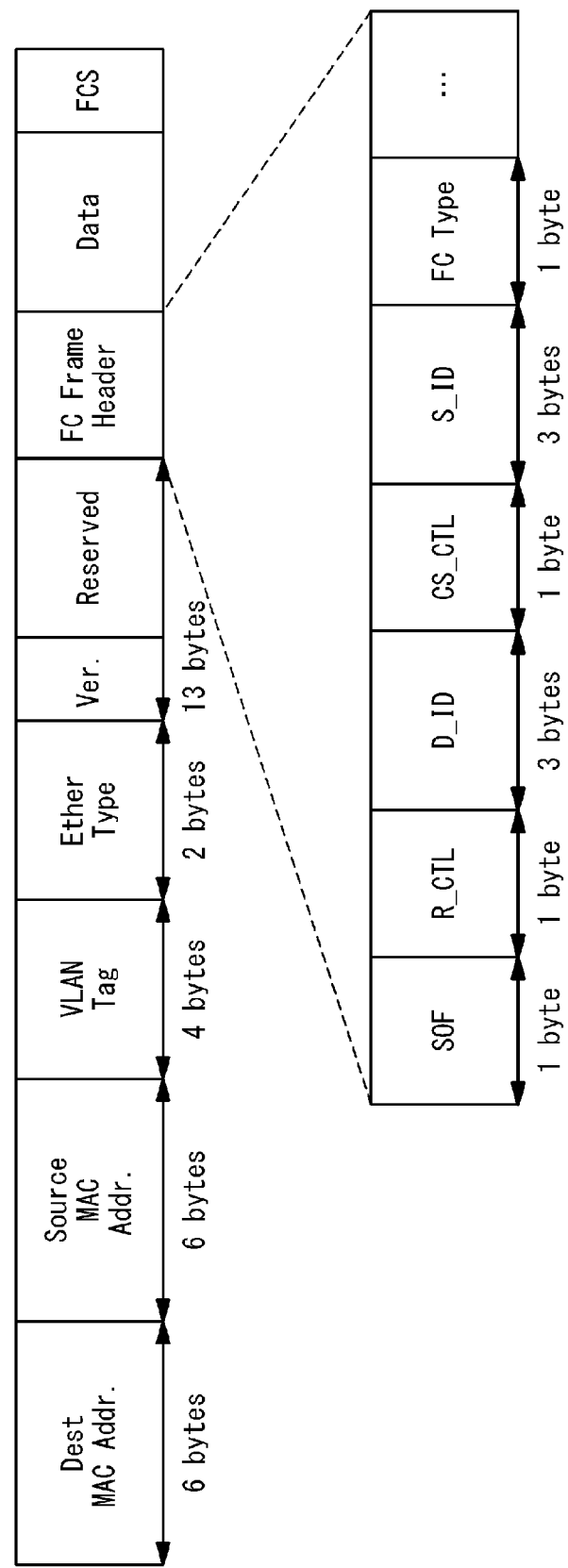
FIG. 9 is a conceptual diagram showing a structure of a SCSI-FCP frame in the typical FCoE communication.

The gateway 3 can determine the frame type by the following method, for example. FIG. 9 is a conceptual diagram showing a structure of the SCSI-FCP frame. As shown in FIG. 9, there is an element "FC Type: FCP" in the FC Field in the FCoE Field. A point with which the SCSI-FCP frame can be clearly distinguished from the other frames is the "FC Type". Therefore, the gateway 3 can determine whether the received frame 10 is the control frame 11 or the data frame 12 by referring to the "FC Type" of the frame 10.

Moreover, the gateway 3 changes the destination MAC address of the frame 10, as necessary. The reason is as follows. In the case of the conventional FCoE communication, both of the control frame and the data frame go through the FCF 50. Therefore, the source node 1, which may not know a MAC address of the destination node 1, tentatively sets the destination MAC address to a MAC address of the FCF 50, and the FCF 50 converts the destination MAC address. However, according to the present exemplary embodiment, the data frame 12 does not go through the controller 2. Since the node 1 sets the destination MAC address of the transmission frame 10 to a MAC address of the controller 2, the network 4 cannot transfer the data frame 12 to the destination node 1, as long as the conversion of the destination MAC address is not performed in the gateway 3. Therefore, in order that the data frame 12 is transferred to the correct destination, the gateway 3 converts the destination MAC address of the data frame 12 into a MAC address of the destination node 1 and then outputs the data frame 12 to the network 4.

The MAC address used in the conventional FCoE communication is not a MAC address that the node 1 originally owns but is a MAC address that is dedicated to the FCoE communication and distributed by the FCF 50. There is a rule for allocation of the MAC address that is distributed. That is, the upper 3 bytes of the 6 bytes MAC address are fixed while the lower 3 bytes thereof are variable. The lower 3 bytes are used as an address of the node in the FC frame that is encapsulated to be the FCoE frame. In the case of the conventional FCoE communication, when the node 1 transmits the frame 10 to the destination node 1, the MAC address is set to the MAC address of the FCF 50 and a destination address of the FC frame is set to an address of the destination node 1. Therefore, with regard to the frame 10 that is determined to be the data frame 12, the gateway 3 can obtain the MAC address of the destination node 1 in accordance with the above-described rule by analyzing the destination address of the encapsulated FC frame.

In this manner, the data frames 12 are transferred to the destination node 1 through the network 4 and without through the controller 2.

Next, an operation of the controller 2 will be described. The controller 2 is in charge of the processing with respect to the control frames 11 (i.e. other than SCSI-FCP being the data frame 12) that the conventional FCF 50 has performed.

Figure 10:
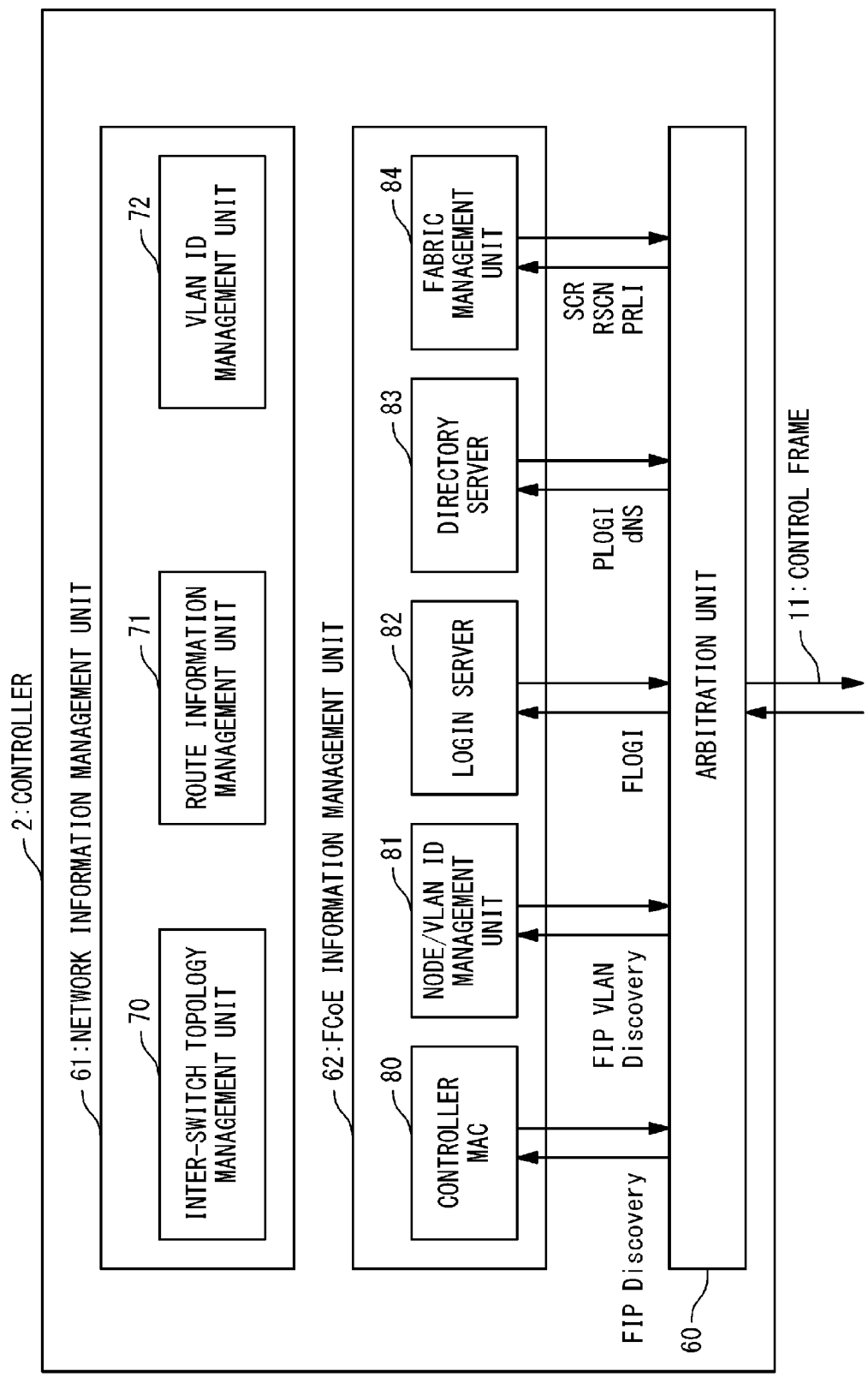
FIG. 10 is a block diagram showing a configuration of a controller in a case where the present invention is applied to the FCoE communication.

FIG. 10 is a block diagram showing a configuration of the controller 2 in the case where the present exemplary embodiment is applied to the FCoE communication. As shown in FIG. 10, the controller 2 has an arbitration unit 60, a network information management unit 61 and an FCoE information management unit 62.

The arbitration unit 60 determines the type of frame that arrives at the controller 2 and forwards the frame to each information management unit (61, 62). Also, the arbitration unit 60 obtains construction information for use in a frame for transmission from each information management unit (61, 62) and transmits the generated frame to the gateway 3.

The network information management unit 61 has an inter-switch topology management unit 70, a route information management unit 71 and a VLAN ID management unit 72.

The inter-switch topology management unit 70 recognizes and manages port connection information of each switch in the network 4.

The route information management unit 71 manages a route between the nodes 1 that is known in the inter-switch topology management unit 70. Also, when receiving a setting request for a route between a new pair of nodes 1 from the FCoE information management unit 62, the route information management unit 71 reflects the route information in each switch.

The VLAN ID management unit 72 manages giving of a VLAN ID to a port of a switch. Also, the VLAN ID management unit 72 searches for a VLAN ID and send a reply, in response to a search request from the FCoE information management unit 62.

The FCoE information management unit 62 has a controller MAC 80, a node/VLAN ID management unit 81, a login server 82, a directory server 83 and a fabric management unit 84.

The controller MAC 80 manages a MAC address for use in communication with the FCoE information management unit 62. The controller MAC 80 replies the MAC address of the controller 2, in response to the FIP Discovery from the node 1.

The node/VLAN ID management unit 81 manages the VLAN ID to which the node 1 belongs. The node/VLAN ID management unit 81 replies the VLAN ID to which the FCoE network belongs, in response to the FIP VLAN Discovery from the node 1.

The login server 82 manages a physical MAC address of the node 1 that is notified by the FLOGI for the purpose of management of the node 1.

The directory server 83 manages WWPN (World Wide Port Name) and WWNN (World Wide Node Name) which are information of each port of the node 1 after the FLOGI and a service class of FC that can be supported. Also, the directory server 73 replies to an inquiry from the node 1 due to the dNS.

The fabric management unit 84 manages a port status of the node 1. When a status change (validation/invalidation of port, entry/withdrawal of port to/from fabric) occurs, the fabric management unit 84 notifies another node of it (RSCN/SCR).

Figure 11:
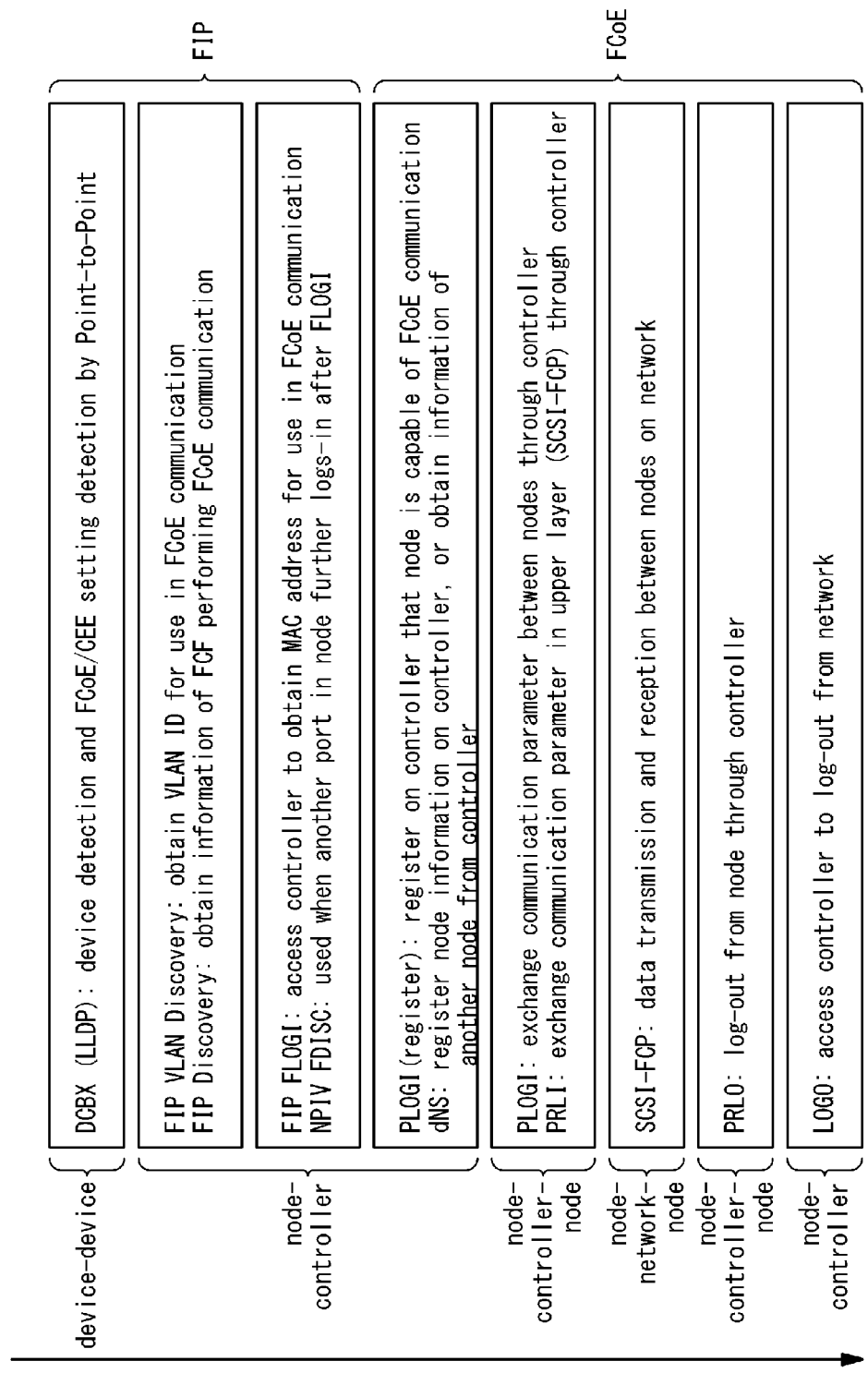
FIG. 11 is a classification diagram of frames in the case where the present invention is applied to the FCoE communication.

FIG. 11 is a classification diagram of frames in the case where the present exemplary embodiment is applied to the FCoE communication. Respective frames will be described in order.

1. DCBX (LLDP): exchange information on extension functions used in the Ethernet communication network for performing the FCoE communication, between links.

2. FIP VLAN Discovery: the node 1 obtains a VLAN ID for use in the FCoE communication from the controller 2.

3. FIP Discovery: the node 1 obtains a MAC address of the controller 2 for use in the FCoE communication from the controller 2.

4. FIP FLOGI: the node 1 accesses the controller 2 to obtain a MAC address of itself for use in the FCoE communication.

5. PLOGI: the node 1 exchanges information for the FCoE communication with the controller 2 and the destination node 1 through the controller 2.

6. PRLI: the node 1 exchanges information for data communication with the destination node 1 through the controller 2.

7. SCSI-FCP: the node 1 communicates with the destination node 1 through the network 4.

8. PRLO: the node 1 cuts off connection between the nodes 1 (deletes information) through the controller 2.

9. LOGO: the node 1 accesses the controller 2 to cut off the connection between the controller 2 and the node 1 (deletes information).

When the present exemplary embodiment is applied to the FCoE communication, as described above, the SCSI-FCP frame as the data frame 12 is separated from the other frames. Then, the SCSI-FCP frame is transferred only by the Ethernet network 4 without through the FCF. Since the SCSI-FCP frames, which greatly contribute to the network performance, need not to go through a specific route, the network performance is increased. Moreover, since a communication device used in the existing Ethernet can be used as well, the network integration becomes easier.

2. Retransmission Control and Reordering Function

The U/C separation function described in the first Section makes it possible to be freed from the constraint of the FCF. Therefore, it is also possible to use an existing Ethernet switch in the network 4.

Meanwhile, it is required in the FCoE that no frame loss occurs. The reason is that occurrence of the frame loss causes a long period of system access halt. According to the conventional FCoE, IEEE802.1 DCB (Data Center Bridging) is defined as a method for achieving a frame lossless network. The DCB standard, which is a method that establishes a network such that no packet discard occurs, requires to add specific functions to both of the node and the switch. Since the switch is required to be provided with a specific function, it is not possible to use an existing Ethernet switch in the network 4. That is to say, if the frame lossless network is achieved by the DCB standard, the advantages due to the U/C separation function described in the first Section are lost.

It is therefore desired to achieve the frame lossless network without adding a function to a switch, instead of the DCB standard. For that purpose, according to the present exemplary embodiment, the node 1 is provided with a retransmission control and reordering function. A configuration and processing in the case where the node 1 is provided with the retransmission control and reordering function will be described hereinafter. It should be noted that a description of the configuration and processing overlapping with the first Section will be omitted as appropriate.

2-1. First Example

Figure 12:
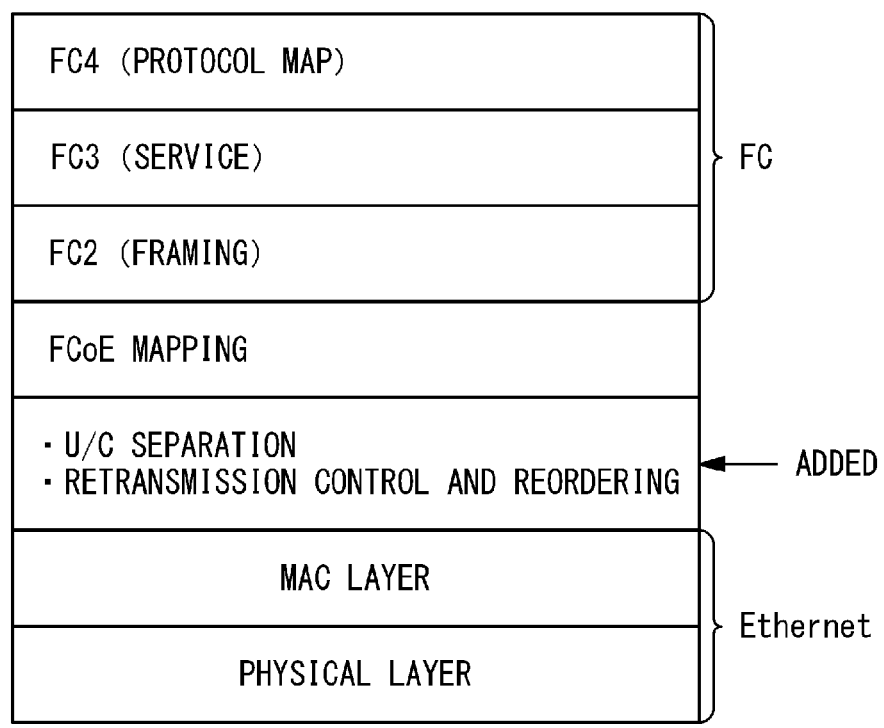
FIG. 12 is a conceptual diagram showing protocol stack according to an exemplary embodiment of the present invention.

FIG. 12 is a conceptual diagram showing protocol stack according to the present exemplary embodiment. A usual FCoE protocol stack consists of FC4 to FC2 layers associated with the FC, an FCoE mapping layer, and a MAC layer and a physical layer associated with the Ethernet. According to the present exemplary embodiment, as shown in FIG. 12, the retransmission control and reordering function is installed in a layer (so-called L2.5 layer) between the FCoE mapping layer and the MAC layer.

The retransmission control function can be achieved by, for example, R2D2 described in B. Atikoglu et al., "R2D2: RAPID AND RELIABLE DATA DELIVERY IN DATA CENTERS", Stanford University.

It should be noted that in the case where the U/C separation function (gateway 3) is built in the network card 40 of the node 1 as shown in FIG. 5, the U/C separation function also is installed in the L2.5 layer. However, the U/C separation function is not necessarily built in the network card 40 of the node 1. The U/C separation function may be built in the gateway 3 provided separately from the node 1 as shown in FIG. 1. In either case, the retransmission control and reordering function is built in the node 1 being a network edge.

Figure 13:
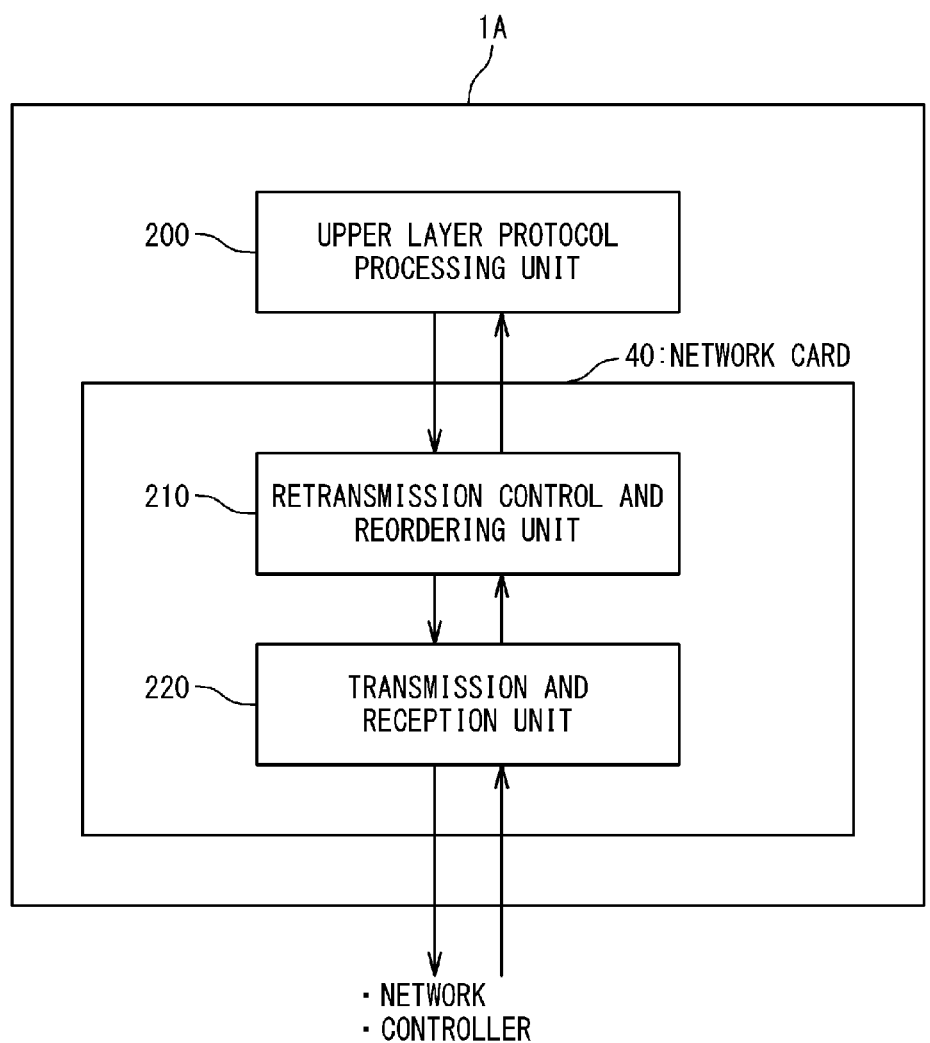
FIG. 13 is a block diagram showing a configuration of a node in a first example of the exemplary embodiment of the present invention.

The node 1 provided with the retransmission control and reordering function is hereinafter referred to as a "node 1A". FIG. 13 is a block diagram showing a configuration of the node 1A according to the present example. The node 1A has an upper layer protocol processing unit 200, a retransmission control and reordering unit 210 and a transmission and reception unit 220. The retransmission control and reordering unit 210 and the transmission and reception unit 220 are built in the network card 40.

The upper layer protocol processing unit 200 has functions of the FC4 to FC2 layers and the FCoE mapping layer shown in FIG. 12. The upper layer protocol processing unit 200 outputs a frame for transmission to the network card 40 and receives a reception frame from the network card 40.

The retransmission control and reordering unit 210 receives the frame for transmission from the upper layer protocol processing unit 200 and outputs the frame for transmission to the transmission and reception unit 220. Moreover, the retransmission control and reordering unit 210 receives a frame from the transmission and reception unit 220 and outputs the received frame to the upper layer protocol processing unit 200. Furthermore, the retransmission control and reordering unit 210 provides the above-mentioned retransmission control and reordering function. That is, in the transmission and reception processing, the retransmission control and reordering unit 210 performs retransmission control and reordering processing with respect to a target frame. In the present exemplary embodiment, the target frame includes the data frame 12 communicated between the nodes 1A. In other words, the retransmission control and reordering unit 210 performs the retransmission control and reordering processing with respect to the data frames 12 communicated between the nodes 1A.

The transmission and reception unit 220 transmits the frame for transmission to the network 4 or the controller 2. Moreover, the transmission and reception unit 220 receives a frame from the network 4 or the controller 2. For example, the U/C separation function is installed in the transmission and reception unit 220.

Figure 14:
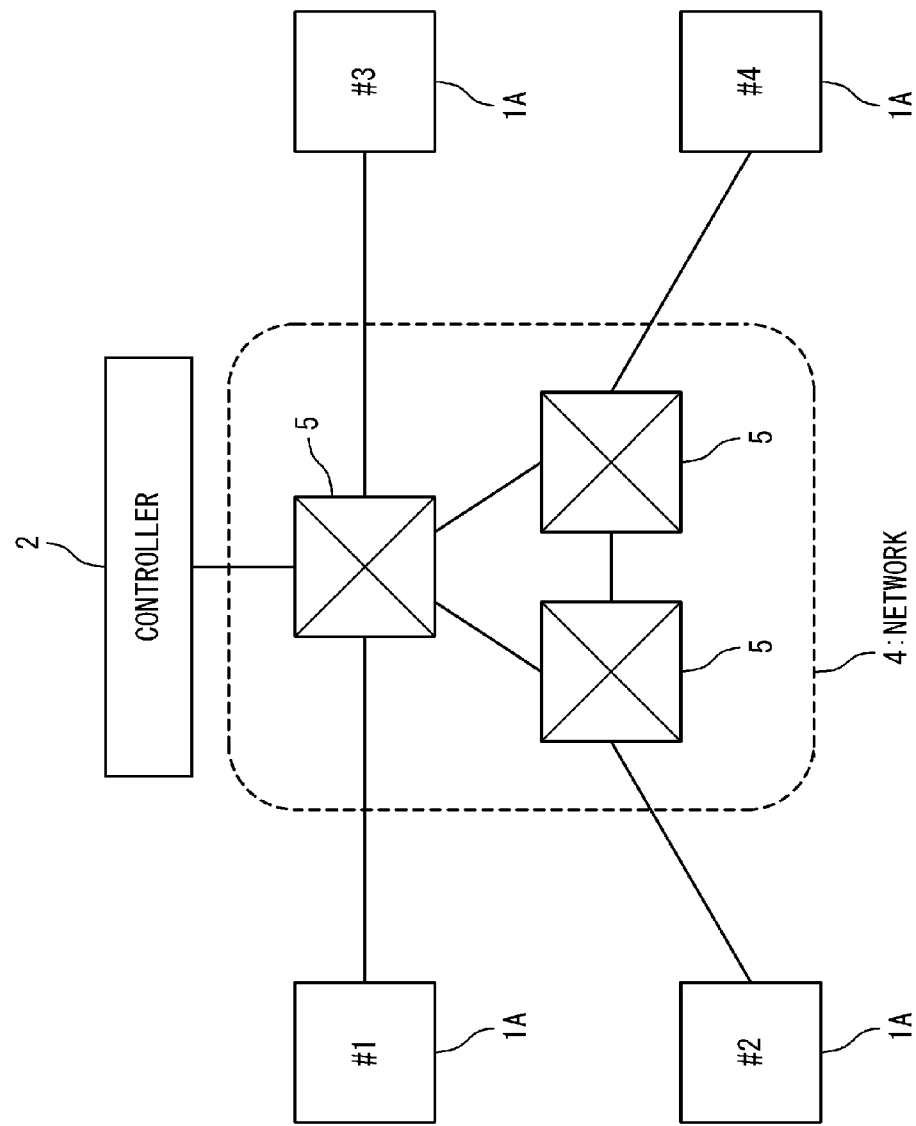
FIG. 14 is a block diagram showing a configuration of a network system in the first example of the exemplary embodiment of the present invention.

FIG. 14 shows a configuration example of the network system wherein the node 1A according to the present exemplary embodiment is used. Note that in the FCoE, a server and a storage may be collectively called an FCoE node (or Enode).

According to the present exemplary embodiment, the data frames 12 (SCSI-FCP frames) are communicated between the nodes 1A through only the network 4 without through the controller 2, due to the above-described U/C separation function. Moreover, a frame lossless network can be achieved since the node 1A performs the retransmission control and reordering processing with respect to the data frames 12. It should be noted here that there is no need to add a specific function to the switch in the network 4, which is different from the case of the conventional DCB standard. That is, the frame lossless network is achieved by the retransmission control and reordering function of the node 1A, without adding a specific function to the switch. Since the above-described U/C separation function makes it possible to be freed from the constraint of the FCF, an existing Ethernet switch 5 can be used in the network 4 as shown in FIG. 14. As a result, the network integration becomes easier.

2-2. Second Example

Figure 15:
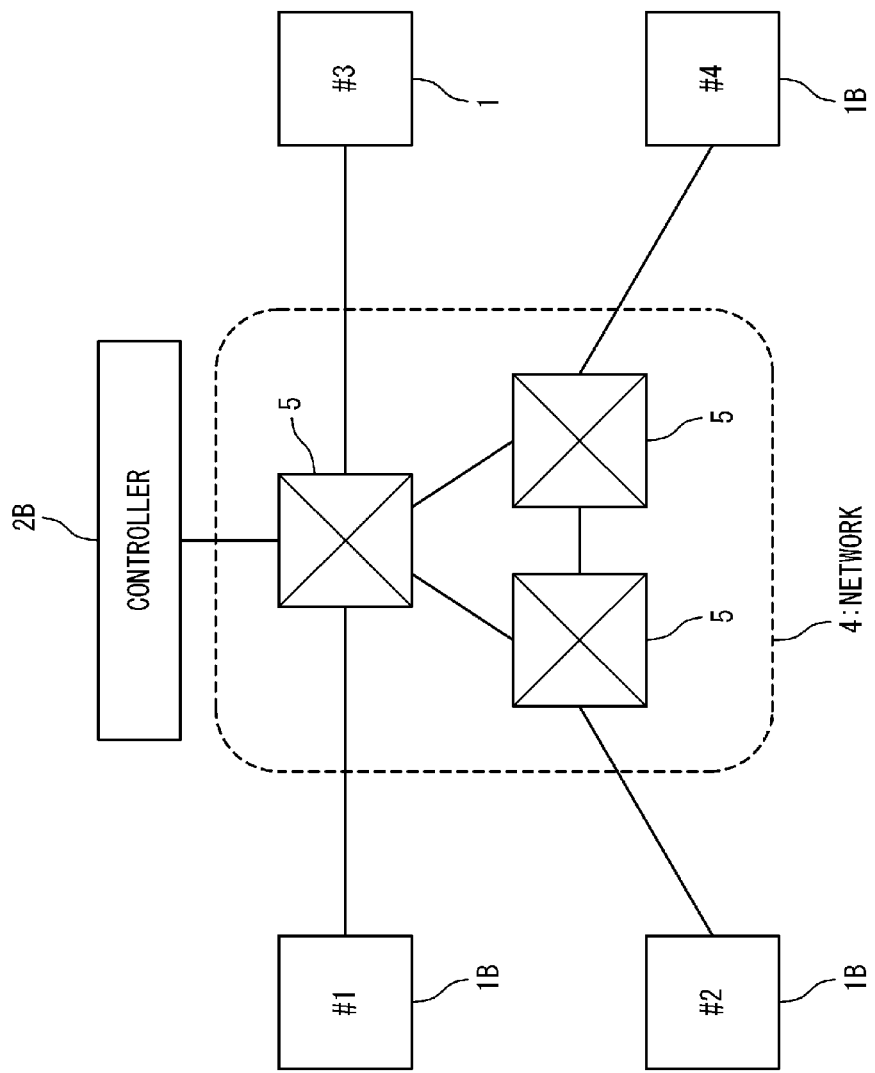
FIG. 15 is a block diagram showing a configuration of a network system in a second example of the exemplary embodiment of the present invention.

There may be a situation where a part of nodes in the network system does not support the retransmission control and reordering function. FIG. 15 shows an example of such the situation. A node 1B (node number: #1, #2, #4) is provided with the retransmission control and reordering function (retransmission control and reordering unit 210). Whereas, the node 1 (node number: #3) is not provided with the retransmission control and reordering function (retransmission control and reordering unit 210).

The retransmission control and reordering processing only makes sense if a source node and a destination node both have the function. If at least one of the source node and the destination node does not have the retransmission control and reordering function, the retransmission control and reordering processing needs to be deactivated. However, in general, whether or not both of them have the retransmission control and reordering function is not known until the End-to-End communication is initiated. If it is revealed after the End-to-End communication has been initiated that the retransmission control and reordering processing needs to be deactivated, a part of the previous communication processing goes to waste.

In order to prevent such the waste of the communication processing from occurring, according to the second example, a possession status of the retransmission control and reordering function is checked before initiating communication. If at least one of the source node and the destination node does not have the retransmission control and reordering function, the function is beforehand deactivated before initiating communication. The function is activated only when the source node and the destination node both have the retransmission control and reordering function.

Figure 16:
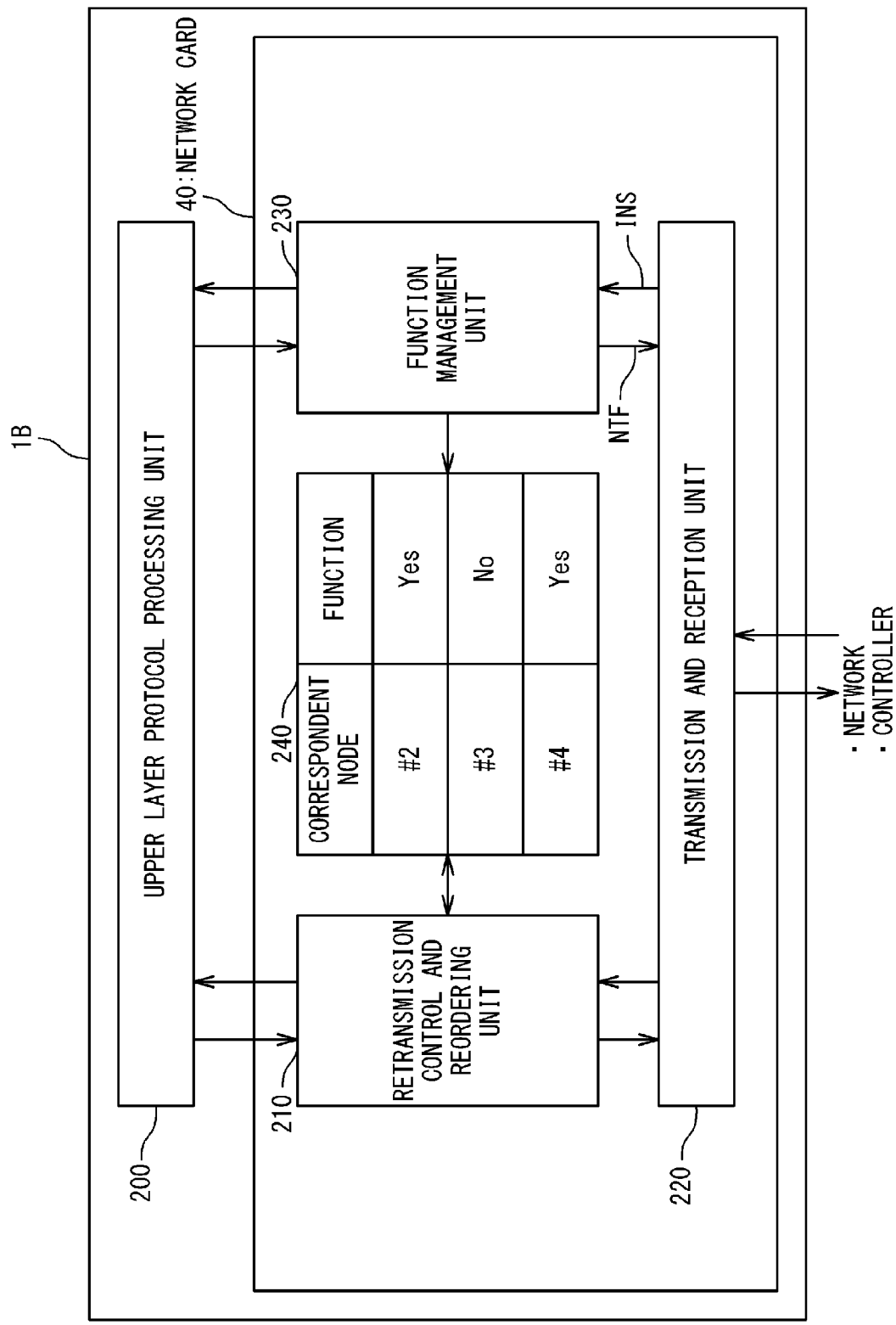
FIG. 16 is a block diagram showing a configuration of a node in the second example of the exemplary embodiment of the present invention.

FIG. 16 is a block diagram showing a configuration of the node 1B according to the present example. The node 1B has a function management unit 230 and a correspondent node function table 240 in addition to the configuration of the node 1A shown in FIG. 13. The function management unit 230 and the correspondent node function table 240 are built in the network card 40.

The function management unit 230 manages the retransmission control and reordering function of the node to which it belongs. More specifically, the function management unit 230 transmits a function notification NTF to the controller 2B through the transmission and reception unit 220. The function notification NTF indicates that the node has the retransmission control and reordering function (retransmission control and reordering unit 210). Moreover, the function management unit 230 receives an instruction INS of activating/deactivating the retransmission control and reordering function (retransmission control and reordering unit 210) from the controller 2B through the transmission and reception unit 220. Then, the function management unit 230 activates or deactivates the retransmission control and reordering function (retransmission control and reordering unit 210) of the node according to the received instruction INS. More specifically, the function management unit 230 updates the correspondent node function table 240 according to the received instruction INS.

The correspondent node function table 240 indicates whether or not the destination node (correspondent node) has the retransmission control and reordering function. For example, in the example shown in FIG. 16, the correspondent node function table 240 of the node 1B (node number: #1) indicates that the nodes 1B (node number: #2, #4) have the function and the node 1 (node number: #3) does not have the function. The function management unit 230 receives activation instructions INS regarding the nodes 1B (node number: #2, #4) and a deactivation instruction INS regarding the node 1 (node number: #3) from the controller 2B. In accordance with the received activation/deactivation instruction INS, the function management unit 230 sets the correspondent node function table 240 as shown in FIG. 16.

The retransmission control and reordering unit 210 refers to the correspondent node function table 240 to determine whether or not to perform the retransmission control and reordering processing. If the correspondent node has the retransmission control and reordering function, the retransmission control and reordering unit 210 performs the retransmission control and reordering processing with respect to the data frames 12 communicated with the correspondent node. This corresponds to the retransmission control and reordering unit 210 being activated. On the other hand, if the correspondent node does not have the retransmission control and reordering function, the retransmission control and reordering unit 210 does not perform the retransmission control and reordering processing with respect to the data frames 12 communicated with the correspondent node. That is, the retransmission control and reordering unit 210 precludes the data frames 12 communicated with the correspondent node from a target of the retransmission control and reordering. This corresponds to the retransmission control and reordering unit 210 being deactivated.

Figure 17:
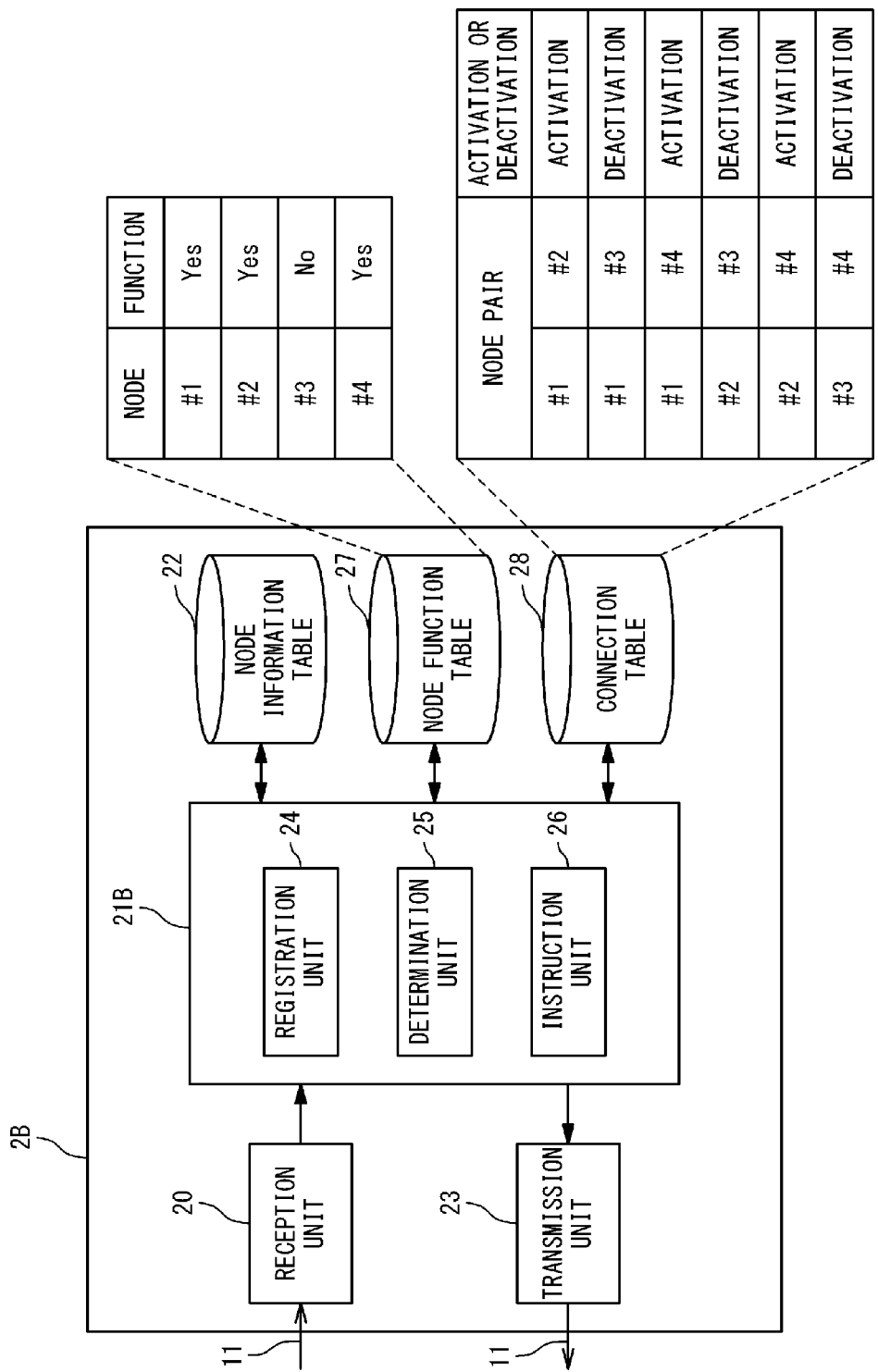
FIG. 17 is a block diagram showing a configuration of a controller in the second example of the exemplary embodiment of the present invention.

FIG. 17 is a block diagram showing a configuration of the controller 2B according to the present example. The controller 2B has a processing unit 21B instead of the processing unit 21 of the controller 2 shown in FIG. 2 and further has a node function table 27 and a connection table 28. The node function table 27 and the connection table 28 are stored in the memory 102 (refer to FIG. 6).

The node function table 27 indicates, with respect to each node, whether or not the node has the retransmission control and reordering function (retransmission control and reordering unit 210). In the example shown in FIG. 17, it indicates that the nodes 1B (node number: #1, #2, #4) has the function and the node 1 (node number: #3) does not have the function.

The connection table 28 indicates, with respect to each node pair, whether the retransmission control and reordering function is activated or deactivated. The node pair is a combination of the source node and the destination node. In the example shown in FIG. 17, the retransmission control and reordering function is deactivated with regard to the node pair including the node 1 (node number: #3). The retransmission control and reordering function is activated with regard to the other node pairs.

The processing unit 21B has a registration unit 24, a determination unit 25 and an instruction unit 26.

The registration unit 24 receives the function notification NTF transmitted from each node and updates the node function table 27 based on the received function notification NTF. More specifically, when receiving the function notification NTF indicative of having the retransmission control and reordering function from a node, the registration unit 24 sets an entry of the said node in the node function table 27 to "Function: Yes".

The determination unit 25 determines, before initiating communication between a source node and a destination node, whether to activate or deactivate the retransmission control and reordering processing with regard to the node pair. More specifically, when receiving a request for initiating communication from a source node to a destination node, the determination unit 25 refers to the node function table 27 to check whether or not the source node and the destination node both have the retransmission control and reordering function. If both of them have the retransmission control and reordering function, the determination unit 25 determines as "activation". On the other hand, if at least one of them does not have the retransmission control and reordering function, the determination unit 25 determines as "deactivation". Then, the determination unit 25 writes the determination result in the connection table 28.

In the case where the determination result is "activation", the instruction unit 26 transmits the activation instruction INS to both of the source node and the destination node. As a result, the retransmission control and reordering units 210 of both of the source node and the destination node are activated. On the other hand, in the case where the determination result is "deactivation", the instruction unit 26 transmits the deactivation instruction INS at least to the node 1B having the retransmission control and reordering function. As a result, the retransmission control and reordering unit 210 of the node 1B is deactivated.

Figure 18:
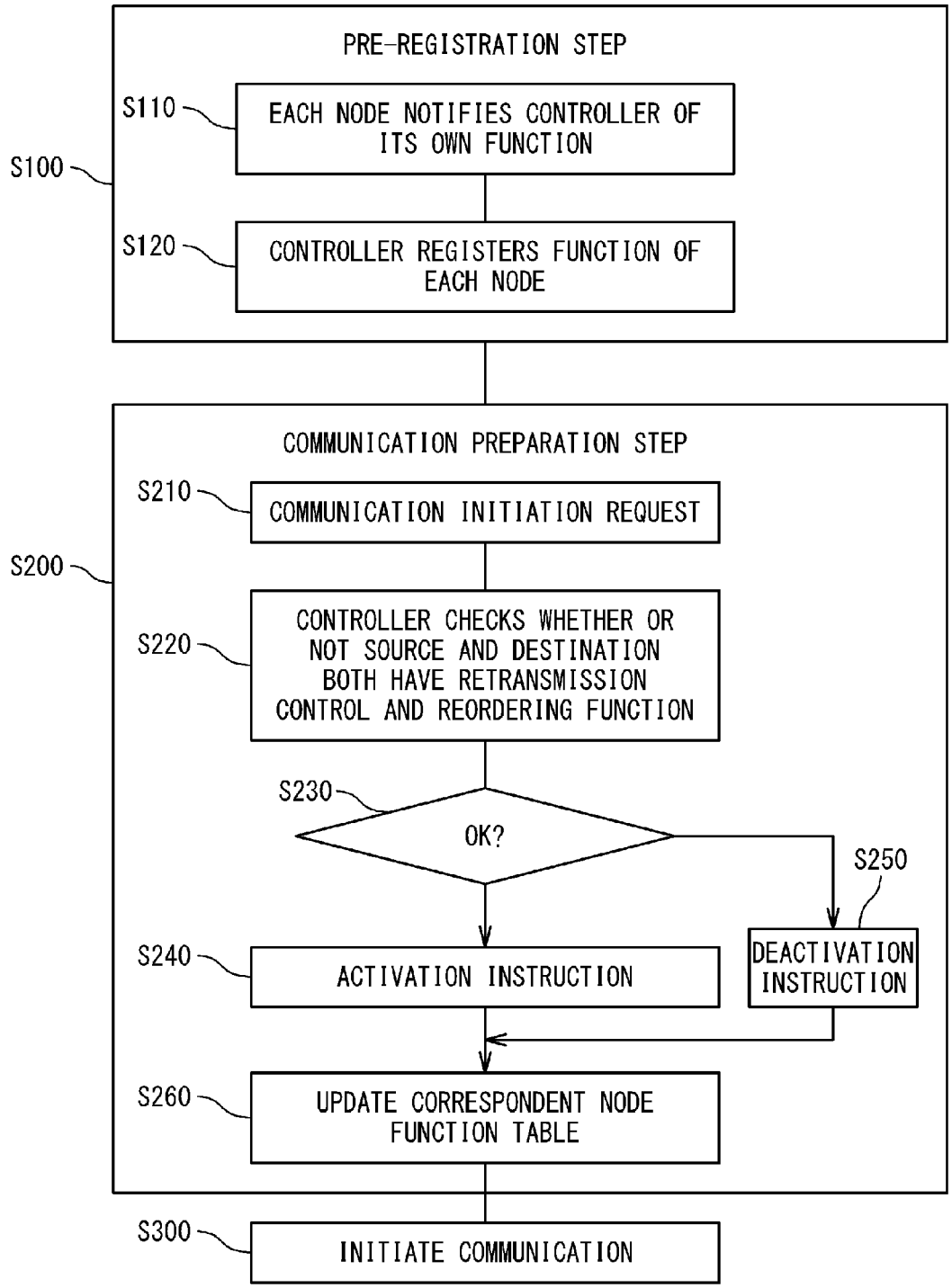
FIG. 18 is a flow chart showing processing in the second example of the exemplary embodiment of the present invention.
Figures 19A, 19B:
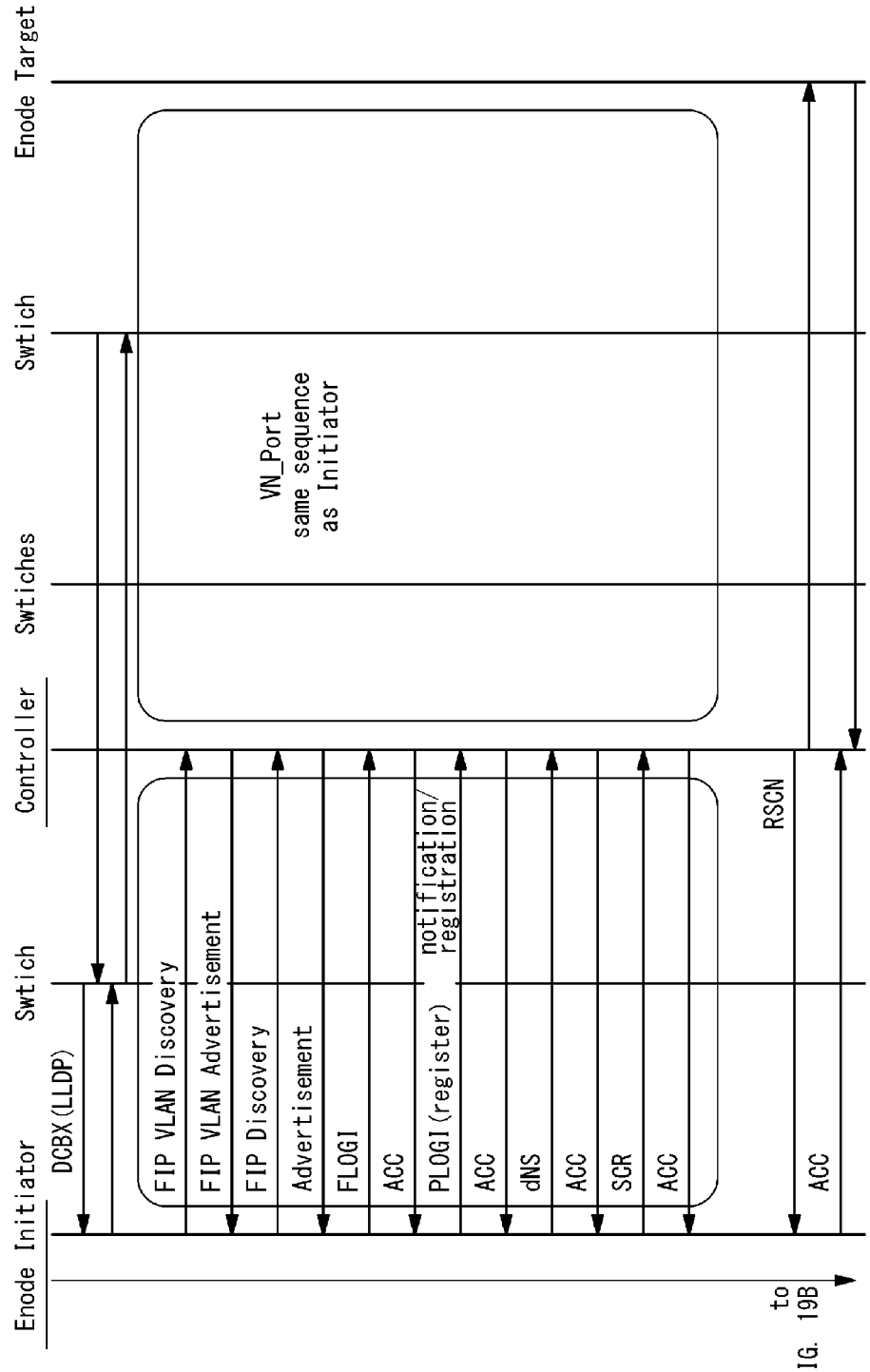
FIG. 19A is a sequence diagram showing processing in the second example of the exemplary embodiment of the present invention.
FIG. 19B is a sequence diagram showing processing in the second example of the exemplary embodiment of the present invention.

FIG. 18 is a flow chart showing processing in the present example. FIGS. 19A and 19B are sequence diagrams showing processing in the present example. As to contents of each frame shown in FIGS. 19A and 19B, refer to the foregoing FIG. 11. Note that "Enode Initiator" represents the source node and "Enode Target" represents the destination node. The "SCR" is a frame for registering in the controller 2 such that the self node becomes a status change notification target node. The "RSCN" is a frame notifying a status change from the controller 2 to the registered node. The "ACC" represents an acknowledgement.

Pre-Registration Step (Step S100):

Before initiating communication with a destination node, the function management unit 230 of the node 1B transmits to the controller 2B a function notification NTF indicating that the self node has the retransmission control and reordering function (retransmission control and reordering unit 210) (Step S110). Based on the function notification NTF, the registration unit 24 of the controller 2B registers the function information in the node function table 27 (Step S120).

For example, as shown in FIG. 19A, the pre-registration step (Step S100) is executed in the PLOGI (register) phase (refer to FIG. 11) being the function registration phase of the FCoE. Not only "being capable of the FCoE communication" but also "being capable of the retransmission control and reordering" is notified from the node 1B to and registered in the controller 2B.

Communication Preparation Step (Step S200):

A source node transmits a request for initiating communication with a destination node to the controller 2B (Step S210). At this time, the source node transmits also the node numbers of the self node and the destination node to the controller 2B. The determination unit 25 of the controller 2B refers to the node function table 27 to check whether or not the source node and the destination node both have the retransmission control and reordering function (Step S220).

If the source node and the destination node both have the retransmission control and reordering function (Step S230; Yes), the determination unit 25 determines as "activation" and writes the determination result in the connection table 28. Then, the instruction unit 26 transmits the activation instruction INS to both of the source node and the destination node (Step S240). The function management unit 230 of the node 1B receiving the activation instruction INS activates the retransmission control and reordering function, namely sets an entry of the correspondent node in the correspondent node function table 240 to "Yes" (Step S260).

On the other hand, if at least one of the source node and the destination node does not have the retransmission control and reordering function (Step S230; No), the determination unit 25 determines as "deactivation" and writes the determination result in the connection table 28. Then, the instruction unit 26 transmits the deactivation instruction INS to the necessary node 1B (Step S250). The function management unit 230 of the node 1B receiving the deactivation instruction INS deactivates the retransmission control and reordering function, namely sets an entry of the correspondent node in the correspondent node function table 240 to "No" (Step S260).

For example, as shown in FIG. 19B, the communication preparation step (Step S200) is executed in the PLOGI phase (refer to FIG. 11) being a login phase of the End-to-End communication.

Step S300: Initiate Communication

After that, the End-to-End communication is initiated between the source node and the destination node. This corresponds to the SCSI-FCP phase being a data transmission phase. The retransmission control and reordering unit 210 of the node 1B refers to the correspondent node function table 240 to determine whether or not to perform the retransmission control and reordering processing. If the correspondent node has the retransmission control and reordering function, the retransmission control and reordering unit 210 performs the retransmission control and reordering processing with respect to the data frames 12 communicated with the correspondent node. On the other hand, if the correspondent node does not have the retransmission control and reordering function, the retransmission control and reordering unit 210 does not perform the retransmission control and reordering processing with respect to the data frames 12 communicated with the correspondent node. That is, the retransmission control and reordering unit 210 precludes the data frames 12 communicated with the correspondent node from a target of the retransmission control and reordering.

In this manner, according to the second example, the possession status of the retransmission control and reordering function is beforehand checked before initiating communication. If at least one of the source node and the destination node does not have the retransmission control and reordering function, the function is beforehand deactivated before initiating communication. As a result, the waste of the communication processing is prevented from occurring.

2-3. Third Example

A dynamical route switching technique that dynamically switches a packet transfer route in a network depending on load change and the like is known. For example, according to a technique "OpenFlow", route control, fault recovery, load balancing and optimization are performed with respect to each flow (Reference Literature: Nick McKeown et al., "OpenFlow: Enabling Innovation in Campus Networks", ACM SIGCOMM Computer Communication Review, Vol. 38, No. 2, 2008.

It should be noted that when the dynamical route switching is performed, such phenomena as temporal packet discard, packet order exchange and packet duplication due to instantaneous loop occurrence may be caused. However, such the packet discard and packet order exchange in the Ethernet layer are not permissible in the FCoE, as described above. The DCB standard of the FCoE is Link-by-Link based and thus cannot resolve the packet discard and the like caused by the dynamical route switching.

Meanwhile, according to the present exemplary embodiment, the node 1A (or node 1B) is provided with the retransmission control and reordering function and thereby the frame lossless network is achieved. Therefore, in the present exemplary embodiment, it is possible to perform the dynamical route switching without causing problems.

Figure 20:
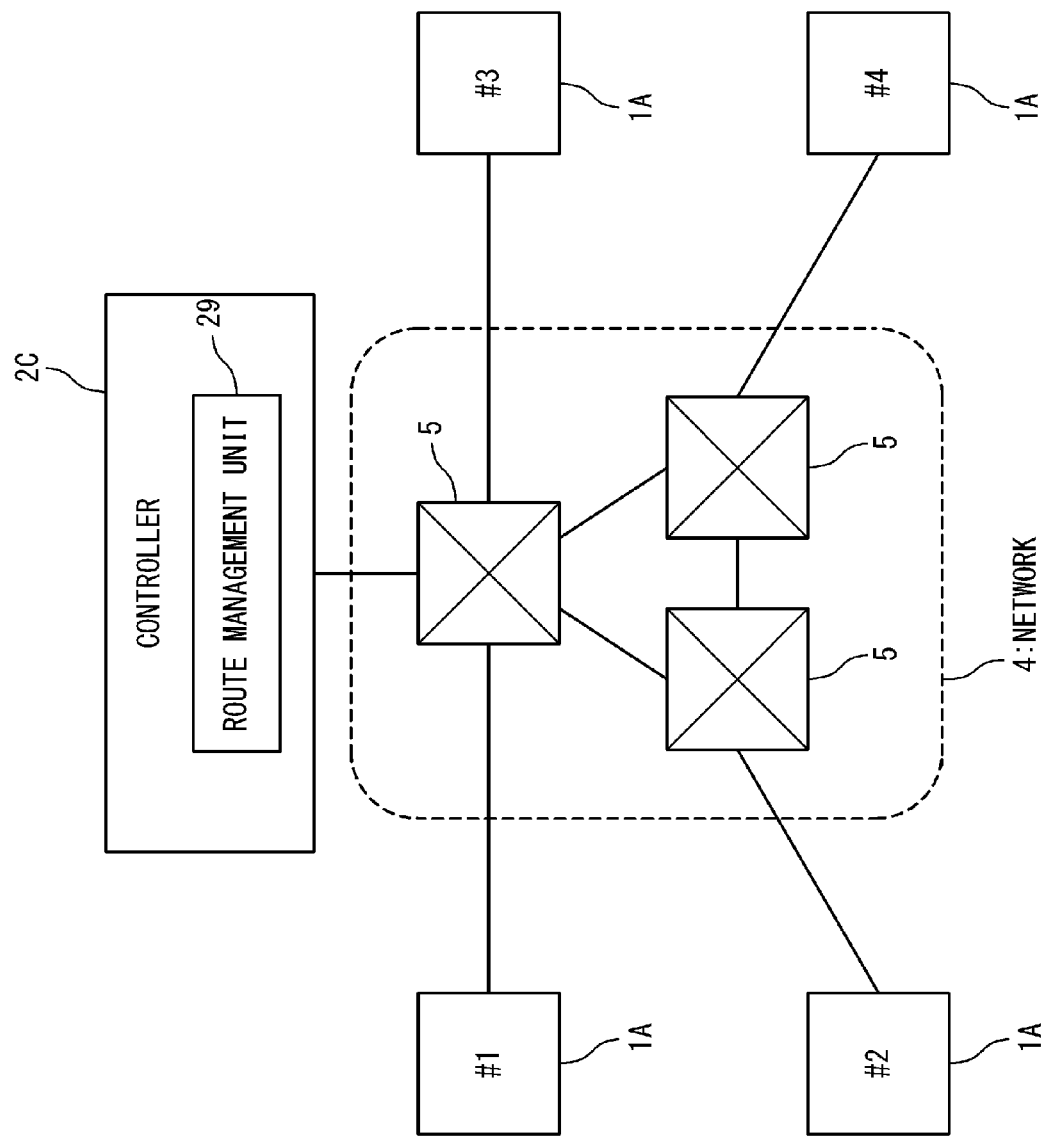
FIG. 20 is a block diagram showing a configuration of a network system in a third example of the exemplary embodiment of the present invention.

FIG. 20 shows an example where the dynamical route switching is performed. In the present example, the controller 2C has a route management unit 29 in addition to the functions of the foregoing controller (or controller 2B). The route management unit 29 has a function of managing and dynamically changing the transfer route of the data frames 12 in the network 4. For example, the route management unit 29 has the same function as that of an open flow controller (OFC) used in the OpenFlow. In this case, an open flow switch (OFS) is used as the switch 5 in the network 4.

In this manner, according to the present example, the transfer route of the data frames 12 in the network 4 is dynamically switched by the controller 2C. Even if discard or order exchange of the data frames 12 is caused by the dynamical route switching, it is recovered by the retransmission control and reordering function installed in the node 1A (or node 1B). That is, it is possible to perform the dynamical route switching without causing system delay/halt.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

(Supplementary Note 1)

A network system comprising:

a node configured to perform transmission and reception of a frame based on FCoE (Fibre Channel Over Ethernet);

a network configured to transfer said frame;

a controller configured to perform management of said node and said network; and a gateway provided with respect to said node, wherein said frame is classified into a control frame for communicating control information necessary for communication and a data frame for communicating data between nodes;

wherein said gateway determines whether a frame received from said node is said control frame or said data frame, forwards said control frame to said controller, and forwards said data frame to said network;

wherein said controller performs said management based on said control frame received from said gateway;

wherein said network transfers said data frame received from said gateway to a destination node without through said controller; and wherein said node comprises a retransmission control and reordering unit configured to perform retransmission control and reordering processing with respect to said data frame.

(Supplementary Note 2)

The network system according to Supplementary note 1, wherein said controller retains a node function table that indicates whether or not each node has said retransmission control and reordering unit;

wherein before said node initiates communication of said data frame with said destination node, said controller refers to said node function table to check whether or not said node and said destination node both have said retransmission control and reordering unit;

wherein if said node and said destination node both have said retransmission control and reordering unit, said controller activates said retransmission control and reordering unit of both of said node and said destination node; and wherein if said destination node does not have said retransmission control and reordering unit, said controller deactivates said retransmission control and reordering unit of said node.

(Supplementary Note 3)

The network system according to Supplementary note 2, wherein when activating said retransmission control and reordering unit, said controller transmits an activation instruction to said node;

wherein when deactivating said retransmission control and reordering unit, said controller transmits a deactivation instruction to said node; and wherein said node activates said retransmission control and reordering unit in response to said activation instruction and deactivates said retransmission control and reordering unit in response to said deactivation instruction.

(Supplementary Note 4)

The network system according to Supplementary note 3, wherein said node retains a correspondent node function table that indicates whether or not said destination node has said retransmission control and reordering unit;

wherein said node updates said correspondent node function table according to said activation instruction and said deactivation instruction;

wherein said retransmission control and reordering unit of said node refers to said correspondent node function table to determine whether or not to perform said retransmission control and reordering processing with respect to said data frame communicated with said destination node;

wherein in a case of said activation instruction, said correspondent node function table indicates that said destination node has said retransmission control and reordering unit, and said retransmission control and reordering unit of said node performs said retransmission control and reordering processing with respect to said data frame communicated with said destination node; and wherein in a case of said deactivation instruction, said correspondent node function table indicates that said destination node does not have said retransmission control and reordering unit, and said retransmission control and reordering unit of said node does not perform said retransmission control and reordering processing with respect to said data frame communicated with said destination node.

(Supplementary Note 5)

The network system according to any one of Supplementary notes 2 to 4, wherein before initiating communication, a node having said retransmission control and reordering unit transmits a function notification indicative of having said retransmission control and reordering unit to said controller; and wherein said controller updates said node function table based on said function notification.

(Supplementary Note 6)

The network system according to any one of Supplementary notes 1 to 5, wherein said retransmission control and reordering unit is built in a network card of said node.

(Supplementary Note 7)

The network system according to any one of Supplementary notes 1 to 6, wherein said node sets a destination MAC address of said frame to a MAC address of said controller; and wherein when said received frame is said data frame, said gateway converts the destination MAC address of said data frame into a MAC address of said destination node and then outputs said data frame to said network.

(Supplementary Note 8)

The network system according to any one of Supplementary notes 1 to 7, wherein said gateway determines an FCP frame as said data frame and determines the rest frame as said control frame.

(Supplementary Note 9)

The network system according to any one of Supplementary notes 1 to 8, wherein said gateway is built in a network card of said node.

(Supplementary Note 10)

The network system according to any one of Supplementary notes 1 to 9, wherein said controller has a function of dynamically changing a transfer route of said data frame in said network.

(Supplementary Note 11)

A frame communication method in a network system, wherein said network system comprises:

a node configured to perform transmission and reception of a frame based on FCoE (Fibre Channel Over Ethernet);

a network configured to transfer said frame; and a controller configured to perform management of said node and said network, wherein said frame is classified into a control frame for communicating control information necessary for communication and a data frame for communicating data between nodes, wherein said frame communication method comprises:

determining whether a frame transmitted from said node is said control frame or said data frame;

forwarding said control frame to said controller and performing, in said controller, said management based on said control frame;

forwarding said data frame to said network and transferring said data frame to a destination node without through said controller; and performing, in said node, retransmission control and reordering processing with respect to said data frame.

This application is based upon and claims the benefit of priority from Japanese patent application No. 2010-246216, filed on Nov. 2, 2010 and Japanese patent application No. 2011-086151, filed on Apr. 8, 2011, the disclosure of which is incorporated herein in its entirely by reference.

EXPLANATION OF REFERENCE NUMERALS 1, 1A, 1B node
2, 2B, 2C controller
3 gateway
4 network
5 Ethernet switch
10 frame
11 control frame
12 data frame
20 reception unit
21, 21B processing unit
22 node information table
23 transmission unit
24 registration unit
25 determination unit
26 instruction unit
27 node function table
28 connection table
29 route management unit
30 dividing unit
31 address conversion unit
32 multiplexing unit
40 network card
50 FCF 60 arbitration unit
61 network information management unit
62 FCoE information management unit
70 inter-switch topology management unit
72 route information management unit
72 VLAN ID management unit
80 controller MAC
81 node/VLAN ID management unit
82 login server
83 directory server
84 fabric management unit
90 server
100 NIC
101 CPU
102 memory
200 upper layer protocol processing unit
210 retransmission control and reordering unit
220 transmission and reception unit
230 function management unit
240 correspondent node function table

The invention claimed is:

1. A network system, comprising:
a node configured to perform transmission and reception of a frame based on FCoE (Fibre Channel Over Ethernet);
a network configured to transfer said frame;
a controller configured to perform management of said node and said network; and
a gateway provided with respect to said node,
wherein said frame is classified into a control frame for communicating control information necessary for communication and a data frame for communicating data between nodes,
wherein said gateway determines whether a frame received from said node is said control frame or said data frame, forwards said control frame to said controller, and forwards said data frame to said network,
wherein said controller performs said management based on said control frame received from said gateway,
wherein said network transfers said data frame received from said gateway to a destination node without through said controller,
wherein said node comprises a transmitter and receiver configured to perform retransmission control and reordering processing with respect to said data frame,
wherein said controller retains a node function table that indicates whether or not each node includes said transmitter and receiver,
wherein, before said node initiates communication of said data frame with said destination node, said controller refers to said node function table to check whether or not said node and said destination node both include said transmitter and receiver,
wherein, if said node and said destination node both include said transmitter and receiver, said controller activates said transmitter and receiver of both of said node and said destination node, and
wherein, if said destination node does not include said transmitter and receiver, said controller deactivates said transmitter and receiver of said node.

2. The network system according to claim 1, wherein when activating said transmitter and receiver, said controller transmits an activation instruction to said node,
wherein, when deactivating said transmitter and receiver, said controller transmits a deactivation instruction to said node, and
wherein said node activates said transmitter and receiver in response to said activation instruction and deactivates said transmitter and receiver in response to said deactivation instruction.

3. The network system according to claim 2, wherein said node retains a correspondent node function table that indicates whether or not said destination node has said transmitter and receiver,
wherein said node updates said correspondent node function table according to said activation instruction and said deactivation instruction,
wherein said transmitter and receiver of said node refers to said correspondent node function table to determine whether or not to perform said retransmission control and reordering processing with respect to said data frame communicated with said destination node,
wherein, in a case of said activation instruction, said correspondent node function table indicates that said destination node includes said transmitter and receiver, and said transmitter and receiver of said node performs said retransmission control and reordering processing with respect to said data frame communicated with said destination node; and
wherein, in a case of said deactivation instruction, said correspondent node function table indicates that said destination node does not include said transmitter and receiver, and said transmitter and receiver of said node does not perform said retransmission control and reordering processing with respect to said data frame communicated with said destination node.

4. The network system according to claim 1, wherein, before initiating communication, a node including said transmitter and receiver transmits a function notification indicative of including said transmitter and receiver to said controller, and
wherein said controller updates said node function table based on said function notification.

5. The network system according to claim 1, wherein said transmitter and receiver is built in a network card of said node.

6. The network system according to claim 1, wherein said node sets a destination MAC address of said frame to a MAC address of said controller, and
wherein, when said received frame is said data frame, said gateway converts the destination MAC address of said data frame into a MAC address of said destination node and then outputs said data frame to said network.

7. The network system according to claim 1, wherein said gateway determines Fibre Channel Protocol (FCP) frame as said data frame and determines data frames except the FCP frame determined as said data frame as said control frame.

8. The network system according to claim 1, wherein said gateway is built in a network card of said node.

9. The network system according to claim 1, wherein said controller has a function of dynamically changing a transfer route of said data frame in said network.

10. A frame communication method in a network system, wherein said network system comprises:
a node configured to perform transmission and reception of a frame based on FCoE (Fibre Channel Over Ethernet);
a network configured to transfer said frame; and
a controller configured to perform management of said node and said network,
wherein said frame is classified into a control frame for communicating control information necessary for communication and a data frame for communicating data between nodes, wherein said frame communication method comprises:
  determining whether a frame transmitted from said node comprises said control frame or said data frame;
  forwarding said control frame to said controller and performing, in said controller, said management based on said control frame;
  forwarding said data frame to said network and transferring said data frame to a destination node without through said controller;
  performing by a transmitter and receiver, in said node, retransmission control and reordering processing with respect to said data frame; and
  retaining a node function table that indicates whether or not each node includes said transmitter and receiver,
wherein, before said node initiates communication of said data frame with said destination node, said controller refers to said node function table to check whether or not said node and said destination node both include said transmitter and receiver,
wherein, if said node and said destination node both include said transmitter and receiver, said controller activates said transmitter and receiver of both of said node and said destination node, and
wherein, if said destination node does not include said transmitter and receiver, said controller deactivates said transmitter and receiver of said node.

* * * * *